(12) United States Patent
Li et al.

(10) Patent No.: US 12,745,314 B2
(45) Date of Patent: Sep. 22, 2026

(54) COMMUNICATION METHOD AND RELATED APPARATUS

(71) Applicant: HUAWEI TECHNOLOGIES CO., LTD., Shenzhen (CN)

(72) Inventors: Xiangyu Li, Shanghai (CN); Wenjie Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 18/498,323

(22) Filed: Oct. 31, 2023

(65) Prior Publication Data

US 2024/0064861 A1 Feb. 22, 2024

Related U.S. Application Data

(63) Continuation of application No. PCT/CN2022/087561, filed on Apr. 19, 2022.

(30) Foreign Application Priority Data

May 6, 2021 (CN) ......................... 202110490919.3

(51) Int. Cl.
*H04W 76/28* (2018.01)
*H04W 72/25* (2023.01)
*H04W 92/18* (2009.01)

(52) U.S. Cl.
CPC ........... *H04W 76/28* (2018.02); *H04W 72/25* (2023.01); *H04W 92/18* (2013.01)

(58) Field of Classification Search
USPC .... 370/229, 230, 230.1, 236, 252, 311, 328, 370/329, 330, 436
See application file for complete search history.

(56) References Cited

U.S. PATENT DOCUMENTS 12,520,373 B2 * 1/2026 Zhao ..................... H04W 76/28
2021/0051587 A1 * 2/2021 Wu ....................... H04W 76/28
(Continued)

FOREIGN PATENT DOCUMENTS

CN 111567070 A 8/2020
WO 2018064477 A1 4/2018
WO 2021080240 A1 4/2021

OTHER PUBLICATIONS

Fujitsu, "Reservation Chain-Based DRX Power Saving", 3GPP TSG RAN WG2 Meeting #113-e, R2-2100421, XP051973603, Jan. 25-Feb. 5, 2021, 6 pages.
(Continued)

*Primary Examiner* — Nguyen H Ngo
(74) *Attorney, Agent, or Firm* — Maier & Maier, PLLC

(57) ABSTRACT

A communication method and a related apparatus. The method is applied to a first terminal device, and the first terminal device is a terminal device that uses sidelink discontinuous reception (SL DRX). The method includes: sending a first message to a second terminal device, where the first message includes a first resource set, and the first resource set is used by the second terminal device for sidelink (SL) transmission; and using a resource corresponding to the first resource set as activation time of the SL DRX, or disabling the SL DRX on the resource corresponding to the first resource set; and monitoring sidelink control information (SCI) on the resource corresponding to the first resource set, where the SCI includes SCI from the second terminal device. Embodiments are implemented to avoid impact on quality of communication between terminal devices.

5 Claims, 7 Drawing Sheets

(56) References Cited

U.S. PATENT DOCUMENTS

| | | | | |
|---|---|---|---|---|
| 2021/0243836 | A1* | 8/2021 | Wu | H04W 72/20 |
| 2022/0046745 | A1* | 2/2022 | Ryu | H04W 52/028 |
| 2022/0394810 | A1 | 12/2022 | Hong | |
| 2023/0156857 | A1* | 5/2023 | Hong | H04W 52/028 370/328 |
| 2023/0328697 | A1* | 10/2023 | Zhao | H04W 72/25 370/329 |

OTHER PUBLICATIONS

3GPP TS 38.321, "3rd Generation Partnership Project; Technical Specification Group Radio Access Network; NR; Medium Access Control (MAC) Protocol Specification (Release 16)", 3GPP Organizational Partners, Mar. 2021, V16.4.0, 157 pages.

LG Electronics, "Feature Lead Summary for AI 8.11.2.2 Feasibility and Benefits for Mode 2 Enhancements", 3GPP TSG RAN WG1 #103-e, R1-2009788, Oct. 26-Nov. 13, 2020, 79 pages.

* cited by examiner

Antenna
31
33
Radio frequency circuit
Memory
Processor
32
Input/Output Apparatus

COMMUNICATION METHOD AND RELATED APPARATUS

CROSS-REFERENCE TO RELATED APPLICATIONS

This application is a continuation of International Application No. PCT/CN2022/087561, filed on Apr. 19, 2022, which claims priority to Chinese Patent Application No. 202110490919.3, filed on May 6, 2021. The disclosures of the aforementioned applications are herein incorporated by reference in their entireties.

TECHNICAL FIELD

The embodiments relate to the field of communication technologies and to a communication method and a related apparatus.

BACKGROUND

When a terminal device A performs sidelink (SL) communication with a terminal device B, the terminal device A may use SL discontinuous reception (DRX). In other words, the terminal device A may monitor sidelink control information (SCI) only at some moments. Therefore, the terminal device A can receive, only at some moments, data sent by another terminal device. For example, the terminal device A can receive, only at some moments, data sent by the terminal device B. When the terminal device A uses the SL DRX, quality of communication between the terminal device A and the terminal device B may be affected. Therefore, how to avoid impact on quality of communication between terminal devices becomes a technical problem to be urgently resolved in a current phase.

SUMMARY

The embodiments include a communication method and a related apparatus, to avoid impact on quality of communication between terminal devices.

According to a first aspect, a communication method is provided. The method is applied to a first terminal device, the first terminal device is a terminal device that uses sidelink discontinuous reception (SL DRX), and the method includes:

sending a first message to a second terminal device, where the first message includes a first resource set, and the first resource set is used by the second terminal device for SL transmission;

using a resource corresponding to the first resource set as activation time of the SL DRX, or disabling the SL DRX on the resource corresponding to the first resource set; and monitoring sidelink control information (SCI) on the resource corresponding to the first resource set, where the SCI includes SCI from the second terminal device.

It can be understood that in the foregoing solution, the first terminal device that uses the SL DRX may use the resource corresponding to the first resource set sent to the second terminal device as the activation time of the SL DRX, or disable the SL DRX on the resource corresponding to the first resource set sent to the second terminal device, so that the first terminal device can monitor the SCI on the resource corresponding to the first resource set, and the first terminal device can receive the SCI from the second terminal device when the second terminal device performs SL transmission based on the first resource set, and therefore can subsequently receive the SL data sent by the second terminal device. This avoids impact on quality of communication between the first terminal device and the second terminal device when the first terminal device uses the SL DRX.

Optionally, the sending of a first message to a second terminal device includes:

broadcasting the first message, where the first message further includes a destination layer 2 identifier or a destination layer 1 identifier, and the destination layer 2 identifier or the destination layer 1 identifier indicates a service type corresponding to the first resource set.

It can be understood that in the foregoing solution, the first terminal device broadcasts the first message, the first message further includes the destination layer 2 identifier or the destination layer 1 identifier, and the destination layer 2 identifier or the destination layer 1 identifier indicates the service type corresponding to the first resource set, so that the second terminal device can obtain the first resource set based on the destination layer 2 identifier or the destination layer 1 identifier.

Optionally, the first message is a PC5 radio resource control (RRC) message, and an RRC layer of the first terminal device indicates, to a media access control (MAC) layer of the first terminal device, activation time corresponding to the first resource set, or indicates the MAC layer of the first terminal device to disable the SL DRX; or the first message is a physical (PHY) layer message, and a PHY layer of the first terminal device indicates, to the MAC layer of the first terminal device, the activation time corresponding to the first resource set, or indicates the MAC layer of the first terminal device to disable the SL DRX; or the first message is an SL MAC control element (CE) message.

According to a second aspect, a communication method is provided. The method is applied to a first terminal device, the first terminal device is a terminal device that uses SL DRX, and the method includes:

receiving a second message from a second terminal device, where the second message is used to request a second resource set, and the second resource set is used by the second terminal device for SL transmission;

disabling the SL DRX;

performing monitoring in a period in which the SL DRX is disabled, to obtain the second resource set; and sending a third message to the second terminal device, where the third message includes the second resource set.

It can be understood that in the foregoing solution, the first terminal device that uses the SL DRX may receive, from the second terminal device, a message used to request a resource set, so that the first terminal device that uses the SL DRX can disable the SL DRX, and perform monitoring in the period in which the SL DRX is disabled, to obtain a resource set that meets a requirement of the second terminal device. In addition, the resource set that meets the requirement of the second terminal device is sent to the second terminal device, so that the second terminal device can obtain the resource set that meets the requirement. This avoids impact on quality of communication between the first terminal device and the second terminal device when the first terminal device uses the SL DRX.

Optionally, the disabling of the SL DRX includes:

disabling the SL DRX at a first moment.

The first moment is determined based on a moment at which the first terminal device receives the second message from the second terminal device.

Optionally, the second message is a PC5 RRC message, and an RRC layer of the first terminal device indicates a MAC layer of the first terminal device to disable the SL DRX; or the second message is a physical layer message, and a PHY layer of the first terminal device indicates the MAC layer of the first terminal device to disable the SL DRX; or the second message is an SL MAC CE message.

Optionally, the method further includes: enabling the SL DRX at a second moment, where the second moment is determined based on a moment at which the first terminal device sends the third message to the second terminal device; or the second moment is determined based on the first moment and first duration, and the first moment is determined based on the moment at which the first terminal device receives the second message from the second terminal device; or the second moment is determined based on a moment at which the first terminal device obtains the second resource set.

It can be understood that in the foregoing solution, the first terminal device enables the SL DRX at the second moment, so that the first terminal device stops monitoring a PSCCH, to reduce energy consumption.

According to a third aspect, a communication method is provided. The method is applied to a first terminal device, the first terminal device is a terminal device that uses SL DRX, and the method includes:

receiving a second message from a second terminal device, where the second message is used to request a second resource set, and the second resource set is used by the second terminal device for SL transmission;

determining activation time of the SL DRX based on the second message;

performing monitoring in the activation time of the SL DRX, to obtain the second resource set; and sending a third message to the second terminal device, where the third message includes the second resource set.

It can be understood that in the foregoing solution, the first terminal device that uses the SL DRX may receive, from the second terminal device, a message used to request a resource set, so that the first terminal device that uses the SL DRX can determine the activation time of the SL DRX based on the message that is used to request the resource set and that is received from the second terminal device, and perform monitoring in the activation time of the SL DRX to obtain a resource set that meets a requirement of the second terminal device. In addition, the resource set that meets the requirement of the second terminal device is sent to the second terminal device, so that the second terminal device can obtain the resource set that meets the requirement. This avoids impact on quality of communication between the first terminal device and the second terminal device when the first terminal device uses the SL DRX.

Optionally, the determining of activation time of the SL DRX based on the second message includes:

the second message further includes first indication information, and the first indication information indicates time in which the first terminal device performs monitoring; and using the time in which the first terminal device performs monitoring as the activation time of the SL DRX.

It can be understood that in the foregoing solution, the message that is used to request the resource set and that is sent by the second terminal device may further include the indication information, so that time indicated by the indication information is used as the activation time of the SL DRX, and monitoring is performed in the activation time of the SL DRX to obtain the resource set that meets the requirement of the second terminal device.

Optionally, the second message is a PC5 radio resource control (RRC) message, and an RRC layer of the first terminal device indicates the activation time of the SL DRX to a MAC layer of the first terminal device; or the second message is a PHY layer message, and a PHY layer of the first terminal device indicates the activation time of the SL DRX to the MAC layer of the first terminal device; or the second message is an SL MAC CE message.

According to a fourth aspect, a communication method is provided. The method is applied to a first terminal device, the first terminal device is a terminal device that uses SL DR, and the method includes:

sending a fourth message to a second terminal device, where the fourth message is used to request a channel state information report;

disabling the SL DRX; and monitoring SCI in a period in which the SL DRX is disabled, to receive the channel state information report from the second terminal device.

It can be understood that in the foregoing solution, the first terminal device that uses the SL DRX may send the message used to request the channel state information report to the second terminal device, and disable the SL DRX, so that the first terminal device can monitor the SCI in the period in which the SL DRX is disabled, to receive the channel state information report from the second terminal device. This avoids impact on communication quality between the first terminal device and the second terminal device when the SL DRX is applied to the first terminal device.

Optionally, the disabling of the SL DRX includes: disabling the SL DRX at a third moment, where the third moment is determined based on a moment at which the first terminal device sends the fourth message to the second terminal device.

Optionally, a PHY layer of the first terminal device indicates a MAC layer of the first terminal device to disable the SL DRX.

Optionally, the method further includes: enabling the SL DRX at a fourth moment, where the fourth moment is determined based on a moment at which the first terminal device receives the channel state information report from the second terminal device; or the fourth moment is determined based on the third moment and second duration, and the third moment is determined based on the moment at which the first terminal device sends the fourth message to the second terminal device.

It can be understood that in the foregoing solution, the first terminal device enables the SL DRX at the fourth moment, so that the first terminal device stops monitoring the SCI, to reduce energy consumption.

Optionally, the PHY layer of the first terminal device indicates the MAC layer of the first terminal device to enable the SL DRX.

According to a fifth aspect, a communication method is provided. The method is applied to a first terminal device, the first terminal device is a terminal device that uses first SL DRX, and the method includes:

sending a fourth message to a second terminal device, where the fourth message is used to request a channel state information report;

using second SL DRX; and monitoring SCI during using of the second SL DRX, to receive the channel state information report from the second terminal device.

It can be understood that in the foregoing solution, the first terminal device that uses the first SL DRX may send the message used to request the channel state information report to the second terminal device, and uses the second SL DRX, so that the first terminal device can monitor the SCI during using of the second SL DRX, to receive the channel state information report from the second terminal device. This avoids impact on communication quality between the first terminal device and the second terminal device when the first terminal device uses the SL DRX. In addition, because the first terminal device that uses the second SL DRX does not perform full sensing, energy consumption is reduced.

Optionally, the using of second SL DRX includes: using the second SL DRX at a third moment, where the third moment is determined based on a moment at which the first terminal device sends the fourth message to the second terminal device.

Optionally, a PHY layer of the first terminal device indicates a MAC layer of the first terminal device to use the second SL DRX.

Optionally, the method further includes: using the first SL DRX at a fourth moment, where the fourth moment is determined based on a moment at which the first terminal device receives the channel state information report from the second terminal device; or the fourth moment is determined based on the third moment and second duration, and the third moment is determined based on the moment at which the first terminal device sends the fourth message to the second terminal device.

It can be understood that in the foregoing solution, the first terminal device uses the first SL DRX at the fourth moment, so that the first terminal device stops monitoring the SCI, to reduce energy consumption.

Optionally, the PHY layer of the first terminal device indicates the MAC layer of the first terminal device to use the first SL DRX.

According to a sixth aspect, a communication apparatus is provided. The apparatus is a first terminal device that uses SL DRX, and the first terminal device includes a transceiver module and a processing module.

The transceiver module is configured to send a first message to a second terminal device, where the first message includes a first resource set, and the first resource set is used by the second terminal device for SL transmission.

The processing module is configured to use a resource corresponding to the first resource set as activation time of the SL DRX, or disable the SL DRX on the resource corresponding to the first resource set.

The transceiver module is configured to monitor sidelink control information (SCI) on the resource corresponding to the first resource set, where the SCI includes SCI from the second terminal device.

Optionally, when sending the first message to the second terminal device, the transceiver module is configured to broadcast the first message.

The first message further includes a destination layer 2 identifier or a destination layer 1 identifier, and the destination layer 2 identifier or the destination layer 1 identifier indicates a service type corresponding to the first resource set.

Optionally, the first message is a PC5 radio resource control (RRC) message, and an RRC layer of the first terminal device indicates, to a media access control (MAC) layer of the first terminal device, activation time corresponding to the first resource set, or indicates the MAC layer of the first terminal device to disable the SL DRX; or the first message is a physical (PHY) layer message, and a PHY layer of the first terminal device indicates, to the MAC layer of the first terminal device, the activation time corresponding to the first resource set, or indicates the MAC layer of the first terminal device to disable the SL DRX; or the first message is an SL MAC control element (CE) message.

According to a seventh aspect, a communication apparatus is provided. The apparatus is a first terminal device that uses SL DRX, and the first terminal device includes a transceiver module and a processing module.

The transceiver module is configured to receive a second message from a second terminal device, where the second message is used to request a second resource set, and the second resource set is used by the second terminal device for SL transmission.

The processing module is configured to disable the SL DRX.

The processing module is configured to perform monitoring in a period in which the SL DRX is disabled, to obtain the second resource set.

The transceiver module is configured to send a third message to the second terminal device, where the third message includes the second resource set.

Optionally, when disabling the SL DRX, the processing module is configured to disable the SL DRX at a first moment.

The first moment is determined based on a moment at which the first terminal device receives the second message from the second terminal device.

Optionally, the second message is a PC5 RRC message, and an RRC layer of the first terminal device indicates a MAC layer of the first terminal device to disable the SL DRX; or the second message is a physical layer message, and a PHY layer of the first terminal device indicates the MAC layer of the first terminal device to disable the SL DRX; or the second message is an SL MAC CE message.

Optionally, the processing module is further configured to enable the SL DRX at a second moment.

The second moment is determined based on a moment at which the first terminal device sends the third message to the second terminal device; or the second moment is determined based on the first moment and first duration, and the first moment is determined based on the moment at which the first terminal device receives the second message from the second terminal device; or the second moment is determined based on a moment at which the first terminal device obtains the second resource set.

According to an eighth aspect, a communication apparatus is provided. The apparatus is a first terminal device that uses SL DRX, and the first terminal device includes a transceiver module and a processing module.

The transceiver module is configured to receive a second message from a second terminal device, where the second message is used to request a second resource set, and the second resource set is used by the second terminal device for SL transmission.

The processing module is configured to determine activation time of the SL DRX based on the second message.

The processing module is configured to perform monitoring in the activation time of the SL DRX, to obtain the second resource set.

The transceiver module is configured to send a third message to the second terminal device, where the third message includes the second resource set.

Optionally, the second message further includes first indication information, the first indication information indicates time in which the first terminal device performs monitoring. When determining the activation time of the SL DRX based on the second message, the processing module is configured to use the time in which the first terminal device performs monitoring as the activation time of the SL DRX.

Optionally, the second message is a PC5 radio resource control (RRC) message, and an RRC layer of the first terminal device indicates the activation time of the SL DRX to a MAC layer of the first terminal device; or the second message is a PHY layer message, and a PHY layer of the first terminal device indicates the activation time of the SL DRX to the MAC layer of the first terminal device; or the second message is an SL MAC CE message.

According to a ninth aspect, a communication apparatus is provided. The apparatus is a first terminal device that uses SL DRX, and the first terminal device includes a transceiver module and a processing module.

The transceiver module is configured to send a fourth message to a second terminal device, where the fourth message is used to request a channel state information report.

The processing module is configured to disable the SL DRX.

The transceiver module is configured to monitor SCI in a period in which the SL DRX is disabled, to receive the channel state information report from the second terminal device.

Optionally, when disabling the SL DRX, the processing module is configured to disable the SL DRX at a third moment, where the third moment is determined based on a moment at which the first terminal device sends the fourth message to the second terminal device.

Optionally, a PHY layer of the first terminal device indicates a MAC layer of the first terminal device to disable the SL DRX.

Optionally, the processing module is further configured to: enable the SL DRX at a fourth moment, where the fourth moment is determined based on a moment at which the first terminal device receives the channel state information report from the second terminal device; or the fourth moment is determined based on the third moment and second duration, and the third moment is determined based on the moment at which the first terminal device sends the fourth message to the second terminal device.

Optionally, the PHY layer of the first terminal device indicates the MAC layer of the first terminal device to enable the SL DRX.

According to a tenth aspect, a communication apparatus is provided. The apparatus is a first terminal device that uses SL DRX, and the first terminal device includes a transceiver module and a processing module.

The transceiver module is configured to send a fourth message to a second terminal device, where the fourth message is used to request a channel state information report.

The processing module is configured to use second SL DRX.

The transceiver module is configured to monitor SCI during using of the second SL DRX, to receive the channel state information report from the second terminal device.

Optionally, when using the second SL DRX, the processing module is configured to use the second SL DRX at a third moment, where the third moment is determined based on a moment at which the first terminal device sends the fourth message to the second terminal device.

Optionally, a PHY layer of the first terminal device indicates a MAC layer of the first terminal device to use the second SL DRX.

Optionally, the processing module is further configured to: use the first SL DRX at a fourth moment, where the fourth moment is determined based on a moment at which the first terminal device receives the channel state information report from the second terminal device; or the fourth moment is determined based on the third moment and second duration, and the third moment is determined based on the moment at which the first terminal device sends the fourth message to the second terminal device.

Optionally, the PHY layer of the first terminal device indicates the MAC layer of the first terminal device to use the first SL DRX.

According to an eleventh aspect, a communication apparatus is provided, including a processor, a memory, an input interface, and an output interface. The input interface is configured to receive information from a communication apparatus other than the communication apparatus, the output interface is configured to output information to the communication apparatus other than the communication apparatus. The processor invokes a computer program stored in the memory to implement the method according to the first aspect, the second aspect, the third aspect, the fourth aspect, or the fifth aspect.

In a possible embodiment, the communication apparatus may be a chip implementing the method in the first aspect, the second aspect, the third aspect, the fourth aspect, or the fifth aspect, or a device including the chip.

According to a twelfth aspect, a non-transitory computer-readable storage medium is provided. The non-transitory computer-readable storage medium stores a computer program, and when the computer program is run, the method according to the first aspect, the second aspect, the third aspect, the fourth aspect, or the fifth aspect is implemented.

According to a thirteenth aspect, a communication system is provided. The communication system includes the first terminal device and/or the second terminal device.

BRIEF DESCRIPTION OF DRAWINGS

The following briefly describes accompanying drawings used in descriptions of embodiments or a conventional technology.

DETAILED DESCRIPTION OF EMBODIMENTS

Figure 1:
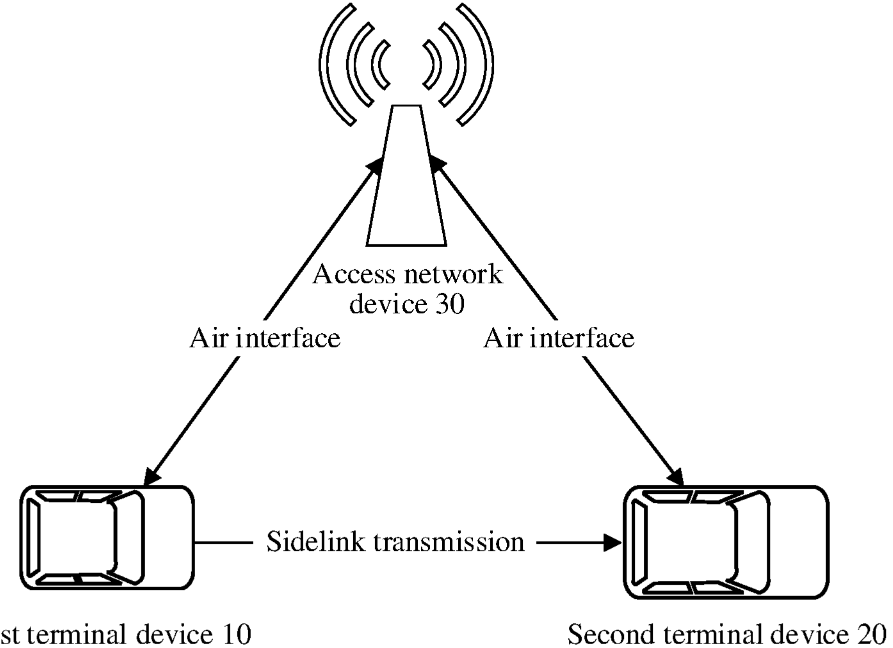
FIG. 1 shows a basic architecture of a communication system according to an embodiment.

The following describes the solutions in embodiments with reference to the accompanying drawings. The terms "system" and "network" may be used interchangeably in embodiments. "I" represents an "or" relationship between associated objects unless otherwise specified. For example, AB may represent A or B. The term "and/or" is merely an association relationship for describing associated objects, and represents that three relationships may exist. For example, A and/or B may represent the following three cases: only A exists, both A and B exist, and only B exists, where A and B each may be singular or plural. In addition, "a plurality of" means two or more than two unless otherwise specified. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the solutions in embodiments, terms such as first and second are used in embodiments to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

Reference to "an embodiment", "some embodiments", or the like described in embodiments means that one or more embodiments include a specific feature, structure, or characteristic described with reference to embodiments. Therefore, statements such as "in an embodiment", "in some embodiments", "in some other embodiments", and "in other embodiments" that appear at different places do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

The following explains and describes some terms (or communication terms) in the embodiments.

1. Sidelink (SL)

The SL is defined for direct communication between terminal devices. That is, the terminal devices directly communicate with each other without forwarding through a base station.

A communication type supported on the SL may include broadcast communication, multicast communication, and unicast communication. In a long term evolution (LTE) system, broadcast communication is supported on the sidelink. In a new radio (NR) system, broadcast communication, multicast communication, and unicast communication are supported on the sidelink.

The broadcast communication is similar to broadcasting system information by an access network device. For example, a terminal device sends data of a broadcast service to the outside without encryption. Any other terminal device within an effective reception scope may receive the data of the broadcast service if the terminal device is interested in the broadcast service.

The multicast communication refers to communication between all terminals in a communication group, and any terminal device in the group can receive and send data of a multicast service.

The unicast communication is similar to data communication performed after a radio resource control (RRC) connection is established between a terminal device and an access network device, and a unicast connection needs to be first established between two terminal devices. After the unicast connection is established, the two terminal devices may perform data communication based on a negotiated identifier. The data may be encrypted, or may not be encrypted. Compared with the broadcast, the unicast communication can be performed only between two terminal devices that establish a unicast connection.

2. Disable (Disable or Deactivation) SL DRX

Disabling the SL DRX may be understood as deactivating the SL DRX or not using an SL DRX configuration. That is, a radio frequency receiver is turned off without being affected by the SL DRX. Correspondingly, enabling the SL DRX may be understood as activating the SL DRX or using an SL DRX configuration. That is, a radio frequency receiver is turned off in a time period based on SL DRX to save power.

3. Activation Time of SL DRX

The activation time of the SL DRX corresponds to time in which the SCI may be monitored, or may be understood as time in which a radio frequency receiver is turned on. Correspondingly, sleep time of the SL DRX corresponds to time in which the SCI is not monitored, or may be understood as time in which the radio frequency receiver is turned off.

4. SCI

The SCI includes first stage SCI (first stage SCI) carried on a physical sidelink control channel (PSCCH) and second stage SCI (second stage SCI) carried on a physical sidelink shared channel (PSSCH).

Monitoring the SCI may be understood as monitoring the first stage SCI and/or monitoring the second stage SCI, or may be understood as monitoring the PSCCH and/or the PSSCH, to obtain the SCI carried on the PSCCH and/or the PSSCH.

In the embodiments, monitoring the first stage SCI may be replaced with monitoring the PSCCH, and monitoring second stage SCI may be replaced with monitoring the PSSCH. This is not limited herein.

5. Time Unit

The time unit may be a time unit with different time granularities such as a frame, a subframe, a slot, a mini-slot, or a symbol.

It should be understood that the solutions in embodiments may be applied to a long term evolution (LTE) architecture, a fifth generation mobile communication technology (5G), a wireless local area network (WLAN) system, a V2X communication system, and the like. The solutions in embodiments may be further applied to another future communication system, for example, a 6G communication system. In the future communication system, a same function may be maintained, but a name may be changed.

The following describes a basic architecture of a communication system according to the embodiments. FIG. 1 shows a basic architecture of a communication system according to an embodiment. As shown in FIG. 1, the communication system may include a first terminal device 10 and a second terminal device 20 that performs SL communication with the first terminal device 10. FIG. 1 is merely a schematic diagram, and does not constitute a limitation on an applicable scenario of solutions provided in the embodiments.

The first terminal device 10 and the second terminal device 20 are entities on a user side that are configured to receive a signal, or send a signal, or receive and send a signal. The first terminal device 10 and the second terminal device 20 are configured to provide one or more of a voice service and a data connectivity service for a user. The first terminal device 10 and the second terminal device 20 may be devices that include a wireless transceiver function and that can cooperate with an access network device to provide a communication service for the user. For example, the first terminal device 10 and the second terminal device 20 may be user equipment (UE), access terminals, subscriber units, subscriber stations, mobile stations, remote stations, remote terminals, mobile devices, terminals, wireless communication devices, user agents, user apparatuses, or roadside units (RSU). The first terminal device 10 and the second terminal device 20 may also be unmanned aerial vehicles, internet of things (IoT) devices, stations (ST) in the WLAN, cellular phones (cellular phone), smart phones (smart phone), cordless phones, wireless data cards, tablet computers, session start protocol (SIP) phones, wireless local loop (WLL) stations, personal digital assistant (PDA) devices, laptop computers (laptop computer), machine type communication (MTC) terminals, handheld devices having a wireless communication function, or computing devices or other processing devices connected to a wireless modem, in-vehicle devices, wearable devices (which may also be referred to as wearable smart devices), virtual reality (VR) terminals, augmented reality (AR) terminals, wireless terminals in industrial control, wireless terminals in self driving, wireless terminals in remote medical, wireless terminals in smart grid, wireless terminals in transportation safety, wireless terminals in smart city, wireless terminals in smart home, and the like. The first terminal device 10 and the second terminal device 20 may also be device-to-device (D2D) devices, for example, electric meters, water meters, and the like. The first terminal device 10 and the second terminal device 20 may alternatively be terminals in a 5G system, or may be terminals in a next-generation communication system. This is not limited.

It may be understood that the first terminal device 10 may further perform SL communication with a terminal device other than the second terminal device 20, and the second terminal device 20 may also perform SL communication with a terminal device other than the first terminal device 10. This is not limited herein.

The communication system may further include one or more access network devices 30 (only one access network device 30 is shown). In the embodiments, the first terminal device 10 and the second terminal device 20 may be located within coverage of a same access network device; or the first terminal device 10 and the second terminal device 20 may be located within coverage of different access network devices; or the first terminal device 10 is located within coverage of an access network device, and the second terminal device 20 is located outside coverage of the access network device (out of coverage); or the first terminal device 10 is located outside coverage of an access network device, and the second terminal device 20 is located within coverage of the access network device; or both the first terminal device 10 and the second terminal device 20 are located outside coverage of the access network device. This is not limited herein.

The access network device 30 is a network side entity that is configured to send a signal, or receive a signal, or send and receive a signal. The access network device 30 may be an apparatus that is deployed in a radio access network (RAN) and that provides a wireless communication function for the first terminal device 10 and the second terminal device 20, for example, may be a transmission and reception point (TRP), a base station, or a control node in various forms. The control node in various forms is, for example, a network controller, a radio controller, or a radio controller in a cloud radio access network (CRAN) scenario. For example, the access network device may be a macro base station, a micro base station (also referred to as a small cell), a relay station, an access point (AP), a radio network controller (RNC), a NodeB (NB), a base station controller (BSC), a base transceiver station (BTS), a home base station (for example, a home evolved NodeB, or a home NodeB, HNB), a baseband unit (BBU), a transmitting and receiving point (TRP), a transmitting point (TP), a mobile switching center, and the like in various forms, and may also be an antenna panel of the base station. The control node may be connected to a plurality of base stations, and configure resources for a plurality of terminals covered by the plurality of base stations. In systems using different radio access technologies, names of devices having functions of the base station may vary. For example, the access network device 30 may be an evolved NodeB (eNB, or eNodeB) in an LTE system, or may be a radio controller in a cloud radio access network (CRAN) scenario, or may be a gNB in 5G. Alternatively, the access network device 30 may be a relay station, an access point, an in-vehicle device, a wearable device, a network side device in a network after 5G, an access network device in a future evolved PLMN network, or the like. A specific name of the access network device is not limited.

It should be noted that the solutions provided in the embodiments may be applicable to a plurality of system architectures. The network architecture and the service scenario described in embodiments are intended to describe the solutions in embodiments more clearly, and do not constitute a limitation on the solutions provided in embodiments. A person of ordinary skill in the art may know that: with the evolution of the network architecture and the emergence of new service scenarios, the solutions provided in embodiments are also applicable to similar problems.

Optionally, the devices (for example, the first terminal device 10, the second terminal device 20, and the access network device 30) in FIG. 1 may be implemented by one device, or may be jointly implemented by a plurality of devices, or may be functional modules in one device. This is not limited in embodiments. It may be understood that the foregoing functions may be network elements in a hardware device, or may be software functions running on dedicated hardware, or may be virtualization functions instantiated on a platform (for example, a cloud platform).

Figure 2:
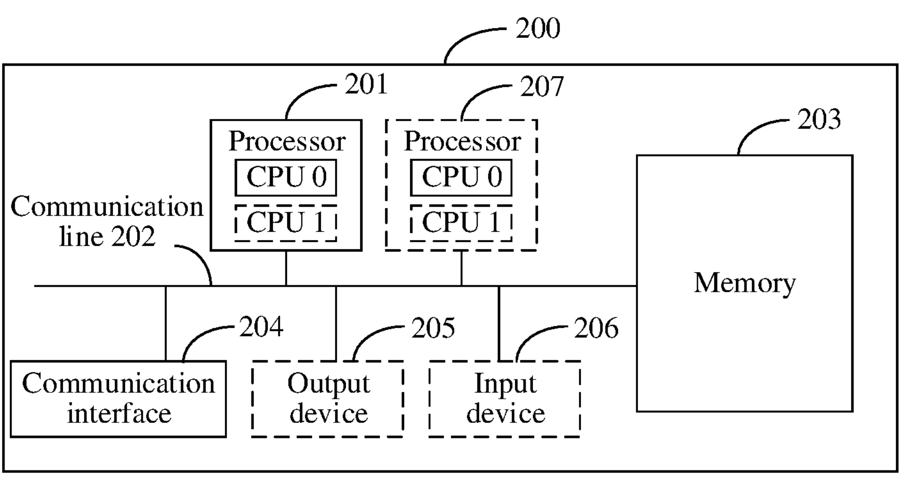
FIG. 2 is a schematic diagram of a hardware structure applicable to a communication apparatus according to an embodiment.

For example, each device in FIG. 1 may be implemented by a communication apparatus 200 in FIG. 2. FIG. 2 is a schematic diagram of a hardware structure applicable to a communication apparatus according to an embodiment. The communication apparatus 200 includes at least one processor 201, a communication line 202, a memory 203, and at least one communication interface 204.

The processor 201 may be a general-purpose central processing unit (CPU), a microprocessor, an application-specific integrated circuit (ASIC), or one or more integrated circuits configured to control execution of programs in the solutions in the embodiments.

The communication line 202 may include a path on which information is transferred between the foregoing components.

The communication interface 204 is any apparatus (such as an antenna) such as a transceiver, and is configured to communicate with another device or a communication network, such as the Ethernet, a RAN, or a wireless local area network (WLAN).

The memory 203 may be a read-only memory (ROM) or another type of static storage device that can store static information and instructions, or a random access memory (RAM) or another type of dynamic storage device that can store information and instructions. The memory 203 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of instructions or a data structure and that is accessible to a computer, but is not limited thereto. The memory may exist independently, and is connected to the processor through the communication line 202. The memory may alternatively be integrated with the processor. The memory provided in embodiments of this application may be non-volatile.

The memory 203 is configured to store computer-executable instructions for executing the solutions in the embodiments, and the processor 201 controls the execution. The processor 201 is configured to execute the computer-executable instruction stored in the memory 203, to implement the method provided in the following embodiments.

Optionally, the computer-executable instructions in this embodiment may also be referred to as application program code. This is not limited in this embodiment.

In a possible implementation, the processor 201 may include one or more CPUs, for example, a CPU 0 and a CPU 1 in FIG. 2.

In a possible implementation, the communication apparatus 200 may include a plurality of processors, for example, the processor 201 and a processor 207 in FIG. 2. Each of the processors may be a single-core (single-CPU) processor, or may be a multi-core (multi-CPU) processor. The processor herein may be one or more devices, circuits, and/or processing cores configured to process data (for example, computer program instructions).

In a possible implementation, the communication apparatus 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector (projector). The input device 206 communicates with the processor 201, and may receive an input from a user in a plurality of manners. For example, the input device 206 may be a mouse, a keyboard, a touchscreen device, or a sensor device.

The foregoing communication apparatus 200 may be a general-purpose device or a dedicated device. During specific implementation, the communication apparatus 200 may be a desktop computer, a portable computer, a network server, a personal digital assistant (PDA), a mobile phone, a tablet computer, a wireless terminal device, an embedded device, or a device having a structure similar to that in FIG. 2. A type of the communication apparatus 200 is not limited in this embodiment.

With reference to the accompanying drawings, the following describes how to improve quality of communication between terminal devices in the solutions provided in the embodiments.

Figures 3, 4:
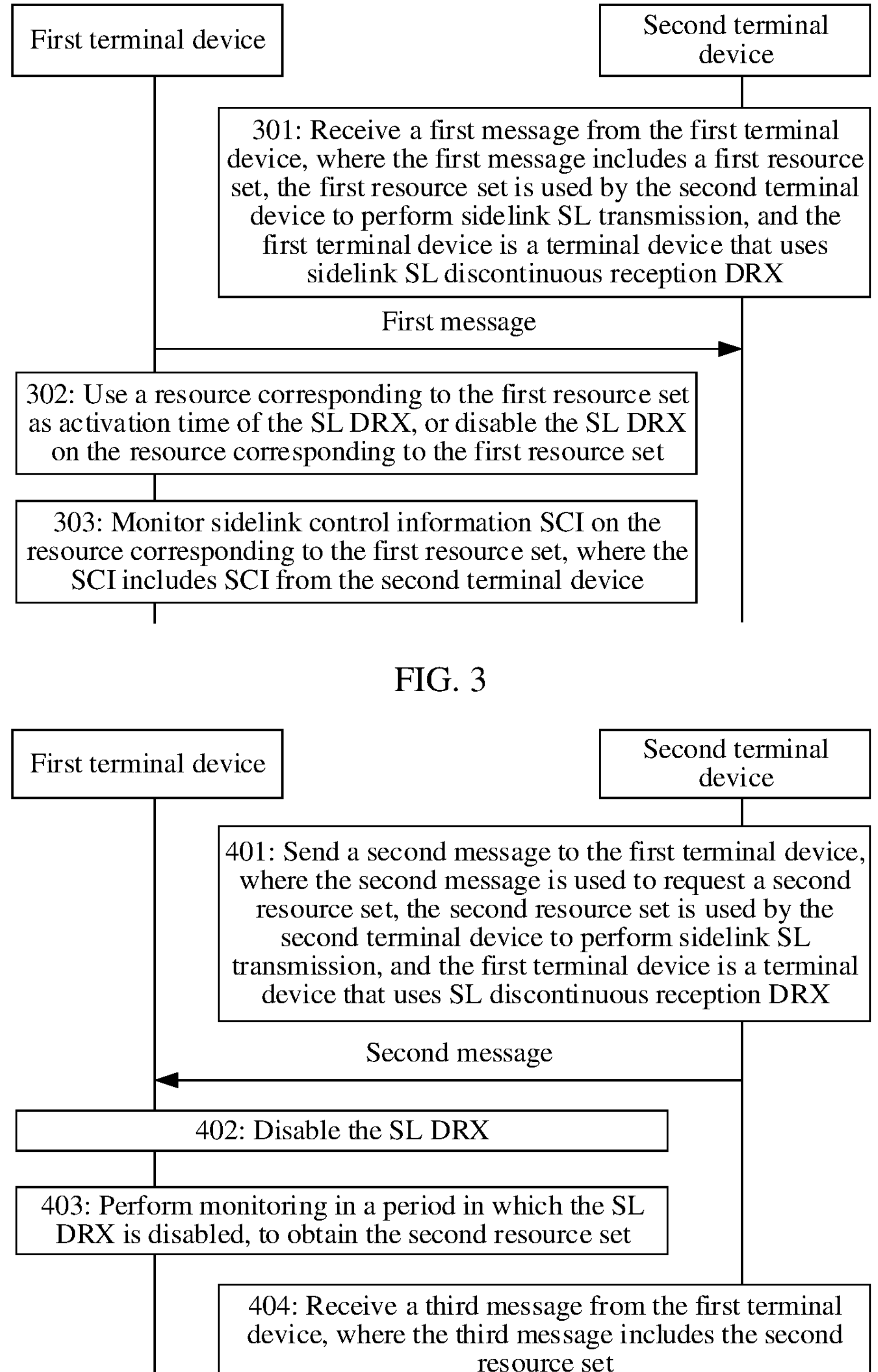
FIG. 3 is a schematic flowchart of a communication method according to an embodiment.
FIG. 4 is a schematic flowchart of another communication method according to an embodiment.

FIG. 3 is a schematic flowchart of a communication method according to an embodiment. A first terminal device in FIG. 3 is the first terminal device 10 in FIG. 1, and a second terminal device in FIG. 3 is the second terminal device 20 in FIG. 1. It should be noted that FIG. 3 describes how to receive data sent by the second terminal device to the first terminal device when the first terminal device uses SL DRX, and how to avoid impact on quality of communication between the first terminal device and the second terminal device when the first terminal device uses the SL DRX. It may be understood that, in the embodiments, the first terminal device is a terminal device that uses the SL DRX. It may be understood that the first terminal device monitors SCI at some moments, or the first terminal device enables a radio frequency receiver at some moments. This is not limited herein. As shown in FIG. 3, the method includes, but is not limited to, the following steps.

301: The second terminal device receives a first message from the first terminal device, where the first message includes a first resource set, the first resource set is used by the second terminal device for SL transmission, and the first terminal device is a terminal device that uses the SL DRX.

Correspondingly, the first terminal device sends the first message to the second terminal device.

The first message may be a PC5 radio resource control (RRC) message, a physical layer (PHY) message, or an SL media access control (MAC) control element (CE) message. This is not limited herein. It may be understood that the PHY layer message may be, for example, sidelink control information (SCI). This is not limited herein.

For example, the first message may be, for example, an inter-terminal device coordination information (inter-UE coordination information) message.

The first resource set may include a time domain resource and a frequency domain resource. This is not limited herein. It may be understood that the time domain resource may be different time granularities such as a frame, a subframe, a slot, a mini-slot, and a symbol. For the frequency domain resource, a band used for SL communication may be divided into several resource blocks (resource block), or a band used for SL communication may be divided into several subchannels (subchannel), and each subchannel includes a specific quantity of resource blocks. One transmission (for example, transmission of control information or data) on the SL may occupy one or more resource blocks or subchannels. The control information may be transmitted through a physical sidelink control channel (PSCCH), and the data may be transmitted through a physical sidelink shared channel (PSSCH).

That the first resource set is used by the second terminal device for SL transmission may be understood as: The first resource set is used by the second terminal device for SL transmission with the first terminal device. That is, the second terminal device performs SL transmission with the first terminal device by using a resource corresponding to the first resource set. Additionally, the first resource set may be further used by the second terminal device for SL transmission with another terminal device. This is not limited herein.

Optionally, that the first terminal device sends a first message to the second terminal device may include: The first terminal device broadcasts the first message. The first message further includes a destination layer 2 identifier (destination L2 ID) or a destination layer 1 identifier (destination L1 ID), and the destination layer 2 identifier or the destination layer 1 identifier indicates a service type corresponding to the first resource set. It may be understood that, if the first terminal device broadcasts the first message, the first message may be an SL MAC CE message or a PHY message. In the embodiments, the SL MAC CE message includes the destination layer 2 identifier, and the PHY message includes the destination layer 1 identifier.

It can be understood that in the foregoing solution, the first terminal device broadcasts the first message, the first message further includes the destination layer 2 identifier or the destination layer 1 identifier, and the destination layer 2 identifier or the destination layer 1 identifier indicates the service type corresponding to the first resource set, so that the second terminal device can obtain the first resource set based on the destination layer 2 identifier or the destination layer 1 identifier.

Optionally, the first message may further include second indication information, and the second indication information indicates that the first resource set is used by the second terminal device for SL transmission with the first terminal device; or the second indication information indicates that the first resource set is used by the second terminal device for SL transmission with a terminal device other than the second terminal device. This is not limited herein.

Optionally, before step 301, the first terminal device may further receive, from the second terminal device, a message used to request a resource set. For a specific process, refer to the embodiment in FIG. 4 or FIG. 5. This is not limited herein.

302: The first terminal device uses a resource corresponding to the first resource set as activation time of the SL DRX, or disables the SL DRX on the resource corresponding to the first resource set.

For the activation time of the SL DRX and the disabling of the SL DRX, refer to the foregoing related description. Details are not described herein again.

That the first terminal device uses a resource corresponding to the first resource set as activation time of the SL DRX may include: The first terminal device uses a time domain resource corresponding to the first resource set as the activation time of the SL DRX.

For example, the time domain resource corresponding to the first resource set is 9 to 11 seconds, and activation time of the SL DRX of the first terminal device before step 302 is 0 to 9 seconds. Therefore, in step 302, it is finally determined that the activation time of the SL DRX is 0 to 11 seconds. It can be understood that the activation time of the SL DRX of the first terminal device is updated from 0 to 9 seconds to 0 to 11 seconds. In addition, the time domain resource corresponding to the first resource set does not overlap the activation time of the SL DRX of the first terminal device before step 302. In other words, the time domain resource corresponding to the first resource set completely overlaps sleep time of the SL DRX of the first terminal device before step 302.

For another example, the time domain resource corresponding to the first resource set is 8 to 11 seconds, and activation time of the SL DRX of the first terminal device before step 302 is 0 to 9 seconds. Therefore, in step 302, it is finally determined that the activation time of the SL DRX is 0 to 11 seconds. It can be understood that the activation time of the SL DRX of the first terminal device is updated from 0 to 9 seconds to 0 to 11 seconds. In addition, the time domain resource corresponding to the first resource set partially overlaps the activation time of the SL DRX of the first terminal device before step 302. In other words, the time domain resource corresponding to the first resource set partially overlaps sleep time of the SL DRX of the first terminal device before step 302.

That the first terminal device disables the SL DRX on the resource corresponding to the first resource set may include: The first terminal device disables the SL DRX on the time domain resource corresponding to the first resource set. It may be understood that the time domain resource corresponding to the first resource set may partially overlap or not overlap the activation time of the SL DRX of the first terminal device before step 302. That is, the time domain resource corresponding to the first resource set may partially or completely overlap the sleep time of the SL DRX of the first terminal device before step 302.

Optionally, step 302 may be replaced with: The first terminal device determines that the time domain resource corresponding to the first resource set overlaps the sleep time of the SL DRX. That the first terminal device determines that the time domain resource corresponding to the first resource set overlaps the sleep time of the SL DRX may be understood as: The first terminal device determines that the time domain resource corresponding to the first resource set partially or completely overlaps the sleep time of the SL DRX.

Optionally, the first message is a PC5 RRC message, and an RRC layer of the first terminal device indicates, to a MAC layer of the first terminal device, activation time corresponding to the first resource set or the time domain resource corresponding to the first resource set, or indicates the MAC layer of the first terminal device to disable the SL DRX. Alternatively, the first message is a PHY layer message, and a PHY layer of the first terminal device indicates, to the MAC layer of the first terminal device, the activation time corresponding to the first resource set or the time domain resource corresponding to the first resource set, or indicates the MAC layer of the first terminal device to disable the SL DRX. Alternatively, the first message is an SL MAC CE message.

That the RRC layer of the first terminal device indicates, to the MAC layer of the first terminal device, activation time corresponding to the first resource set or the time domain resource corresponding to the first resource set, or indicates the MAC layer of the first terminal device to disable the SL DRX may be understood as: At a first moment, the RRC layer of the first terminal device indicates, to the MAC layer of the first terminal device, the activation time corresponding to the first resource set or the time domain resource corresponding to the first resource set, or indicates the MAC layer of the first terminal device to disable the SL DRX.

That the PHY layer of the first terminal device indicates, to the MAC layer of the first terminal device, the activation time corresponding to the first resource set or the time domain resource corresponding to the first resource set, or indicates the MAC layer of the first terminal device to disable the SL DRX may be understood as: At a first moment, the PHY layer of the first terminal device indicates, to the MAC layer of the first terminal device, the activation time corresponding to the first resource set or the time domain resource corresponding to the first resource set, or indicates the MAC layer of the first terminal device to disable the SL DRX.

It should be noted that, if step 302 is that the first terminal device uses the resource corresponding to the first resource set as the activation time of the SL DRX, the RRC layer of the first terminal device indicates, to the MAC layer of the first terminal device at the first moment, the activation time corresponding to the first resource set or the time domain resource corresponding to the first resource set; or the PHY layer of the first terminal device indicates, to the MAC layer of the first terminal device at the first moment, the activation time corresponding to the first resource set or the time domain resource corresponding to the first resource set. If step 302 is that the first terminal device disables the SL DRX on the resource corresponding to the first resource set, the RRC layer of the first terminal device indicates, at the first moment, the MAC layer of the first terminal device to disable the SL DRX or indicates, to the MAC layer of the first terminal device, the time domain resource corresponding to the first resource set; or the PHY layer of the first terminal device indicates, at the first moment, the MAC layer of the first terminal device to disable the SL DRX or indicates, to the MAC layer of the first terminal device, the time domain resource corresponding to the first resource set.

Optionally, the MAC layer of the first terminal device may further indicate, to the PHY layer of the first terminal device, corresponding time for monitoring SCI. The corresponding time for monitoring the SCI is determined by the MAC layer of the first terminal device based on the activation time corresponding to the first resource set.

303: The first terminal device monitors the SCI on the resource corresponding to the first resource set, where the SCI includes SCI from the second terminal device.

Optionally, step 303 may include: The first terminal device monitors the SCI on the time domain resource corresponding to the first resource set, where the SCI includes the SCI from the second terminal device.

It can be understood that in the foregoing solution, the first terminal device that uses the SL DRX may use the resource corresponding to the first resource set sent to the second terminal device as the activation time of the SL DRX, or disable the SL DRX on the resource corresponding to the first resource set sent to the second terminal device, so that the first terminal device can monitor the SCI on the resource corresponding to the first resource set, and the first terminal device can receive the SCI from the second terminal device when the second terminal device performs SL transmission based on the first resource set, and therefore can subsequently receive SL data sent by the second terminal device. This avoids impact on quality of communication between the first terminal device and the second terminal device when the first terminal device uses the SL DRX.

FIG. 4 is a schematic flowchart of another communication method according to an embodiment. A first terminal device in FIG. 4 is the first terminal device 10 in FIG. 1, and a second terminal device in FIG. 4 is the second terminal device 20 in FIG. 1. It should be noted that FIG. 4 describes how to obtain a resource set that meets a requirement of the second terminal device when the first terminal device uses SL DRX, and how to avoid impact on quality of communication between the first terminal device and the second terminal device when the first terminal device uses the SL DRX. As shown in FIG. 4, the method includes but is not limited to the following steps.

401: The second terminal device sends a second message to the first terminal device, where the second message is used to request a second resource set, the second resource set is used by the second terminal device for SL transmission, and the first terminal device is a terminal device that uses the SL DRX.

Correspondingly, the first terminal device receives the second message from the second terminal device.

The second message may be a PC5 RRC message, a PHY layer message, or an SL MAC CE message. This is not limited herein. It may be understood that, for the PHY layer message, refer to the related description in step 301 in FIG. 3. Details are not described herein again.

For example, the second message may be, for example, an inter-terminal device coordination information request (inter-UE coordination information request) message.

The second resource set may include a time domain resource and a frequency domain resource. This is not limited herein. It may be understood that, for the time domain resource and the frequency domain resource, refer to the related description in step 301 in FIG. 3. Details are not described herein again.

That the second resource set is used by the second terminal device for SL transmission may be understood as: The second resource set is used by the second terminal device for SL transmission with the first terminal device. That is, the second terminal device performs SL transmission with the first terminal device by using a resource corresponding to the second resource set. Further, the second resource set may be further used by the second terminal device for SL transmission with another terminal device. This is not limited herein.

Optionally, step 401 may include: The second terminal device broadcasts a second message, where the second message further includes a destination layer 2 identifier or a destination layer 1 identifier, and the destination layer 2 identifier or the destination layer 1 identifier indicates a service type corresponding to the requested second resource set. It may be understood that, if the second terminal device broadcasts the second message, the second message may be an SL MAC CE message or a PHY message.

It can be understood that in the foregoing solution, the second terminal device broadcasts the second message. The second message further includes the destination layer 2 identifier or the destination layer 1 identifier, and the destination layer 2 identifier or the destination layer 1 identifier indicates the service type corresponding to the requested second resource set, so that the first terminal device can determine, based on the destination layer 2 identifier or the destination layer 1 identifier, the second resource set that needs to be obtained.

Optionally, the second message may further include third indication information, and the third indication information indicates that the second resource set is used by the second terminal device for SL transmission with the first terminal device; or the third indication information indicates that the second resource set is used by the second terminal device for SL transmission with a terminal device other than the second terminal device. This is not limited herein.

Optionally, the second message may further include fourth indication information, and the fourth indication information indicates a sensing manner in which the first terminal device obtains the second resource set. A sensing manner in which the first terminal device obtains the second resource set includes one or more of the following: full sensing (full sensing), partial sensing (partial sensing), and random selection (random selection).

402: The first terminal device disables the SL DRX.

For disabling the SL DRX, refer to the foregoing related description. Details are not described herein again.

Optionally, step 402 may include: The first terminal device disables the SL DRX at a first moment. The first moment is determined based on a moment at which the first terminal device receives the second message from the second terminal device. It may be understood that the first moment may be the moment at which the first terminal device receives the second message from the second terminal device; or the first moment may be determined based on the moment at which the first terminal device receives the second message from the second terminal device and at least one time unit. For the time unit, refer to the foregoing related description. Details are not described herein again.

Optionally, that the first moment may be determined based on the moment at which the first terminal device receives the second message from the second terminal device and at least one time unit may be understood as: The first moment is a moment corresponding to the first time unit that is after the moment at which the first terminal device receives the second message from the second terminal device. For example, the first moment is a moment corresponding to a start of the first time unit that is after the moment at which the first terminal device receives the second message from the second terminal device.

For example, if the moment at which the first terminal device receives the second message from the second terminal device is 8:00:28, and one time unit is one minute, the first moment is a moment corresponding to a start of one time unit after the moment at which the first terminal device receives the second message from the second terminal device. That is, the first moment may be 8:01:00.

Optionally, that the first terminal device disables the SL DRX at a first moment may include: The first terminal device disables the SL DRX at the first moment based on the sensing manner in which the first terminal device obtains the second resource set; and the first terminal device disables the SL DRX based on the fourth indication information after the first moment. It may be understood that if the sensing manner in which the first terminal device obtains the second resource set is full sensing and/or partial sensing, or the fourth indication information indicates that the sensing manner of the second resource set is full sensing and/or partial sensing, the first terminal device disables the SL DRX at the first moment.

Optionally, the second message is a PC5 RRC message, and an RRC layer of the first terminal device indicates a MAC layer of the first terminal device to disable the SL DRX; or the second message is a physical layer message, and a PHY layer of the first terminal device indicates the MAC layer of the first terminal device to disable the SL DRX; or the second message is an SL MAC CE message.

That an RRC layer of the first terminal device indicates a MAC layer of the first terminal device to disable the SL DRX may be understood as: At the first moment, the RRC layer of the first terminal device indicates the MAC layer of the first terminal device to disable the SL DRX.

That a PHY layer of the first terminal device indicates the MAC layer of the first terminal device to disable the SL DRX may be understood as: At the first moment, the PHY layer of the first terminal device indicates the MAC layer of the first terminal device to disable the SL DRX.

Optionally, step 402 may include: The first terminal device starts or restarts a first timer at the first moment, and disables the SL DRX during running of the first timer. Duration of the first timer may be duration configured by the second terminal device for the first terminal device by using a PC5 RRC message, or the duration of the first timer may be duration configured by an access network device for the first terminal device by using an RRC message, a system message, or a preconfiguration message. The duration of the first timer may be, for example, predefined in a protocol. This is not limited herein.

Optionally, that the first terminal device starts or restarts the first timer at the first moment, and disables the SL DRX during running of the first timer may be replaced with: The first terminal device disables the SL DRX in a first time period. The first time period is determined based on the first moment and the duration of the first timer.

403: The first terminal device performs monitoring in a period in which the SL DRX is disabled, to obtain the second resource set.

Optionally, step 403 may include: The first terminal device monitors a PSCCH in the period in which the SL DRX is disabled, to obtain the second resource set. The monitoring herein may be understood as sensing, monitor, or the like, and is not limited herein.

Optionally, if step 402 is not performed, step 403 may be replaced with: The first terminal device starts or restarts a second timer at the first moment, and monitors the PSCCH during running of the second timer, to obtain the second resource set. Duration of the second timer is included in activation time of the SL DRX. That is, the SL DRX is in the activation time during running of the second timer. The duration of the second timer may be duration configured by the second terminal device for the first terminal device by using a PC5 RRC message, or the duration of the second timer may be duration configured by an access network device for the first terminal device by using an RRC message, a system message, or a preconfiguration message. The duration of the second timer may be, for example, predefined in a protocol. This is not limited herein.

Optionally, that the first terminal device starts or restarts a second timer at the first moment, and monitors the PSCCH during running of the second timer, to obtain the second resource set may be replaced with: The first terminal device monitors the PSCCH in a second time period, to obtain the second resource set. The second time period is determined based on the first moment and the duration of the second timer.

404: The second terminal device receives a third message from the first terminal device, where the third message includes the second resource set.

Correspondingly, the first terminal device sends the third message to the second terminal device.

The third message may be a PC5 RRC message, a PHY layer message, or an SL MAC CE message. This is not limited herein. It may be understood that the PHY layer message may be, for example, sidelink control information (SCI). This is not limited herein.

For example, the third message may be, for example, an inter-terminal device coordination information (inter-UE coordination information) message.

Optionally, that the first terminal device sends the third message to the second terminal device may include: The first terminal device broadcasts the third message. The third message further includes a destination layer 2 identifier (destination L2 ID) or a destination layer 1 identifier (destination L1 ID), and the destination layer 2 identifier or the destination layer 1 identifier indicates a service type corresponding to the second resource set. It may be understood that if the first terminal device broadcasts the third message, the third message may be an SL MAC CE message or a PHY message. This is not limited herein.

It can be understood that in the foregoing solution, the first terminal device broadcasts the third message, the third message further includes the destination layer 2 identifier or the destination layer 1 identifier, and the destination layer 2 identifier or the destination layer 1 identifier indicates the service type corresponding to the second resource set, so that the second terminal device can obtain the second resource set based on the destination layer 2 identifier or the destination layer 1 identifier.

Optionally, the third message may further include third indication information, and the third indication information indicates that the second resource set is used by the second terminal device for SL transmission with the first terminal device; or the third indication information indicates that the second resource set is used by the second terminal device for SL transmission with a terminal device other than the second terminal device. This is not limited herein.

It can be understood that in the foregoing solution, the first terminal device that uses the SL DRX may receive, from the second terminal device, a message used to request a resource set, so that the first terminal device that uses the SL DRX can disable the SL DRX, and perform monitoring in the period in which the SL DRX is disabled, to obtain a resource set that meets a requirement of the second terminal device. In addition, the resource set that meets the requirement of the second terminal device is sent to the second terminal device, so that the second terminal device can obtain the resource set that meets the requirement. This avoids impact on quality of communication between the first terminal device and the second terminal device when the first terminal device uses the SL DRX.

Optionally, the method further includes: The first terminal device enables the SL DRX at a second moment. The second moment is determined based on a moment at which the first terminal device sends the third message to the second terminal device; or the second moment is determined based on the first moment and first duration; or the second moment is determined based on a moment at which the first terminal device obtains the second resource set.

For enabling the SL DRX, refer to the foregoing related description. Details are not described herein again.

Optionally, the second moment may be the moment at which the first terminal device sends the third message to the second terminal device; or the second moment may be determined based on the moment at which the first terminal device sends the third message to the second terminal device and at least one time unit. For the time unit, refer to the foregoing related description. Details are not described herein again.

Optionally, that the second moment may be determined based on the moment at which the first terminal device sends the third message to the second terminal device and at least one time unit may be understood as: The second moment is a moment corresponding to the first time unit that is after the moment at which the first terminal device sends the third message to the second terminal device. For example, the second moment is a moment corresponding to a start of the first time unit that is after the moment at which the first terminal device sends the third message to the second terminal device.

The first duration may be duration configured by the second terminal device for the first terminal device by using a PC5 RRC message; or the first duration may be duration configured by an access network device for the first terminal device by using an RRC message, a system message, or a preconfiguration message; or the first duration may be predefined in a protocol. This is not limited herein.

Optionally, the second moment may be the moment at which the first terminal device obtains the second resource set; or the second moment may be determined based on the moment at which the first terminal device obtains the second resource set and at least one time unit.

Optionally, that the second moment may be determined based on the moment at which the first terminal device obtains the second resource set and at least one time unit may be understood as: The second moment is a moment corresponding to the first time unit that is after the moment at which the first terminal device obtains the second resource set. For example, the second moment is a moment corresponding to a start of the first time unit that is after the moment at which the first terminal device obtains the second resource set.

It can be understood that in the foregoing solution, the first terminal device enables the SL DRX at the second moment, so that the first terminal device stops monitoring a PSCCH, to reduce energy consumption.

Optionally, the method may further include: The first terminal device enables the SL DRX at a moment at which the first timer expires or stops. The moment at which the first timer stops is determined based on the moment at which the first terminal device sends the third message to the second terminal device; or the moment at which the first timer stops is determined based on the moment at which the first terminal device obtains the second resource set.

Optionally, the moment at which the first timer stops may be the moment at which the first terminal device sends the third message to the second terminal device; or the moment at which the first timer stops may be determined based on the moment at which the first terminal device sends the third message to the second terminal device and at least one time unit.

Optionally, that the moment at which the first timer stops may be determined based on the moment at which the first terminal device sends the third message to the second terminal device and at least one time unit may be understood as: The moment at which the first timer stops is a moment corresponding to the first time unit that is after the moment at which the first terminal device sends the third message to the second terminal device. For example, the moment at which the first timer stops is a moment corresponding to the first time unit that is after the moment at which the first terminal device sends the third message to the second terminal device.

Optionally, the moment at which the first timer stops may be the moment at which the first terminal device obtains the second resource set; or the moment at which the first timer stops may be determined based on the moment at which the first terminal device obtains the second resource set and at least one time unit.

Optionally, that the moment at which the first timer stops may be determined based on the moment at which the first terminal device obtains the second resource set and at least one time unit may be understood as: The moment at which the first timer stops is a moment corresponding to the first time unit that is after the moment at which the first terminal device obtains the second resource set. For example, the moment at which the first timer stops is a moment corresponding to a start of the first time unit that is after the moment at which the first terminal device obtains the second resource set.

It can be understood that in the foregoing solution, the first terminal device enables the SL DRX when the first timer expires or stops, so that the first terminal device stops monitoring the PSCCH, to reduce energy consumption.

Optionally, if step 403 is replaced with: the first terminal device starts or restarts the second timer at the first moment, and monitors the PSCCH during running of the second timer, to obtain the second resource set, the method further includes: The first terminal device enables the SL DRX at a moment at which the second timer expires or stops. The moment at which the second timer stops is determined based on the moment at which the first terminal device sends the third message to the second terminal device; or the moment at which the second timer stops is determined based on the moment at which the first terminal device obtains the second resource set.

Optionally, the moment at which the second timer stops may be the moment at which the first terminal device sends the third message to the second terminal device; or the moment at which the second timer stops may be determined based on the moment at which the first terminal device sends the third message to the second terminal device and at least one time unit.

Optionally, that the moment at which the second timer stops may be determined based on the moment at which the first terminal device sends the third message to the second terminal device and at least one time unit may be understood as: The moment at which the second timer stops is a moment corresponding to the first time unit that is after the moment at which the first terminal device sends the third message to the second terminal device. For example, the moment at which the second timer stops is a moment corresponding to a start of the first time unit that is after the moment at which the first terminal device sends the third message to the second terminal device.

Optionally, the moment at which the second timer stops may be the moment at which the first terminal device obtains the second resource set; or the moment at which the second timer stops may be determined based on the moment at which the first terminal device obtains the second resource set and at least one time unit.

Optionally, that the moment at which the second timer stops may be determined based on the moment at which the first terminal device obtains the second resource set and at least one time unit may be understood as: The moment at which the second timer stops is a moment corresponding to the first time unit that is after the moment at which the first terminal device obtains the second resource set. For example, the moment at which the second timer stops is a moment corresponding to a start of the first time unit that is after the moment at which the first terminal device obtains the second resource set.

It can be understood that in the foregoing solution, the first terminal device enables the SL DRX when the second timer expires or stops, so that the first terminal device stops monitoring the PSCCH, to reduce energy consumption.

Figure 5:
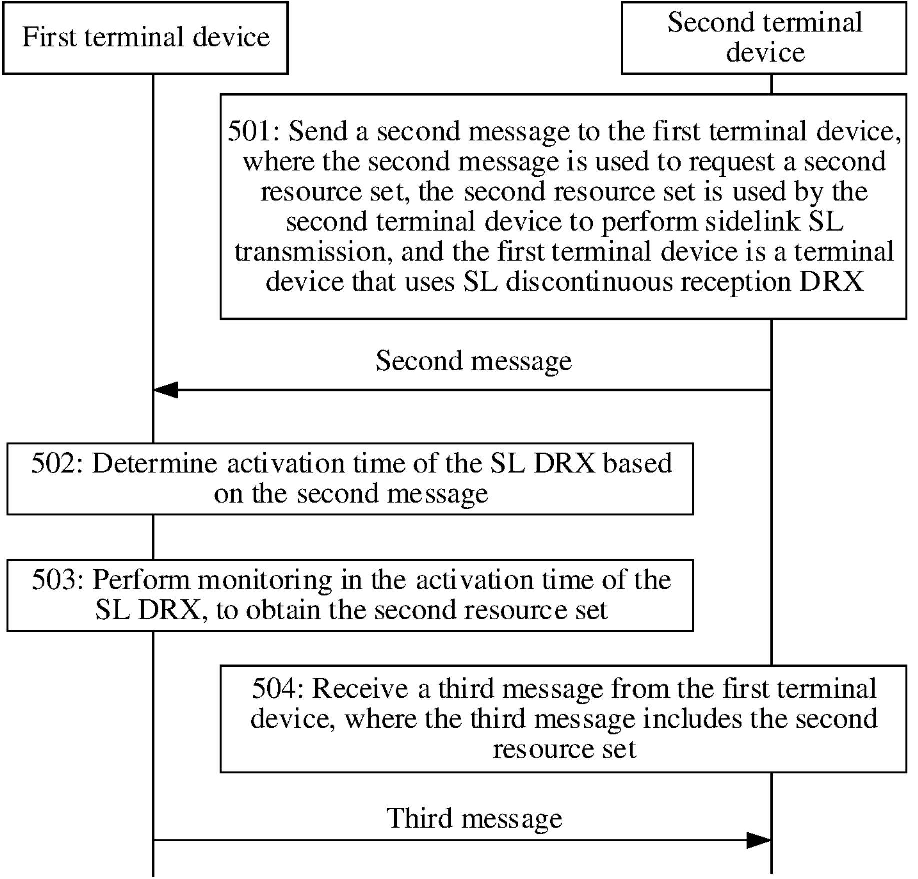
FIG. 5 is a schematic flowchart of still another communication method according to an embodiment.

FIG. 5 is a schematic flowchart of still another communication method according to an embodiment. A first terminal device in FIG. 5 is the first terminal device 10 in FIG. 1, and a second terminal device in FIG. 5 is the second terminal device 20 in FIG. 1. It should be noted that FIG. 5 describes how to obtain a resource set that meets a requirement of the second terminal device when the first terminal device uses SL DRX, and how to avoid impact on quality of communication between the first terminal device and the second terminal device when the first terminal device uses the SL DRX. As shown in FIG. 5, the method includes but is not limited to the following steps.

501: This step is the same as step 401 in FIG. 4, and details are not described herein again.

502: The first terminal device determines activation time of the SL DRX based on the second message.

Optionally, step 502 may include: The second message further includes first indication information, the first indication information indicates time in which the first terminal device performs monitoring, and the time in which the first terminal device performs monitoring is used as the activation time of the SL DRX. That the first indication information indicates time in which the first terminal device performs monitoring may be understood as: The first indication information indicates time in which the first terminal device monitors a PSCCH. The time in which the first terminal device monitors the PSCCH may be included in the activation time of the SL DRX.

Optionally, step 502 may be replaced with: The first terminal device determines the activation time of the SL DRX based on one or more pieces of the following information further included in the second message: transmission priority information of the second terminal device, transmission periodicity information of the second terminal device, a transmission message size of the second terminal device, and resource pool information used by the second terminal device for transmission.

A correspondence between the activation time of the SL DRX and one or more of the transmission priority information of the second terminal device, the transmission periodicity information of the second terminal device, the transmission message size of the second terminal device, and the resource pool information used by the second terminal device for transmission may be configured by the second terminal device by using a PC5 RRC message. Alternatively, the correspondence between the activation time of the SL DRX and one or more of the transmission priority information of the second terminal device, the transmission periodicity information of the second terminal device, the transmission message size of the second terminal device, and the resource pool information used by the second terminal device for transmission may be configured by an access network device by using an RRC message, a system message, or a preconfiguration message. Alternatively, the correspondence between the activation time of the SL DRX and one or more of the transmission priority information of the second terminal device, the transmission periodicity information of the second terminal device, the transmission message size of the second terminal device, and the resource pool information used by the second terminal device for transmission may be predefined in a protocol.

Optionally, the second message is a PC5 RRC message, and an RRC layer of the first terminal device indicates the activation time of the SL DRX to a MAC layer of the first terminal device; or the second message is a PHY layer message, and a PHY layer of the first terminal device indicates the activation time of the SL DRX to the MAC layer of the first terminal device; or the second message is an SL MAC CE message.

503: The first terminal device performs monitoring in the activation time of the SL DRX, to obtain a second resource set.

Optionally, step 502 may not be performed, and the activation time of the SL DRX in step 503 may be determined based on current activation time of the SL DRX of the first terminal device. For example, the activation time of the SL DRX in step 503 may be time that is at least one time unit earlier than a start moment and/or at least one time unit later than an end moment corresponding to the current activation time of the SL DRX of the first terminal device. The current activation time of the SL DRX of the first terminal device may be predefined time, or activation time of the SL DRX before the first terminal device receives the second message from the second terminal device. This is not limited herein.

For example, the activation time of the SL DRX in step 503 may be time that is N time units earlier than the start moment corresponding to the current activation time of the SL DRX of the first terminal device. Alternatively, the activation time of the SL DRX in step 503 may be time that is M time units later than the end moment corresponding to the current activation time of the SL DRX of the first terminal device. Alternatively, the activation time of the SL DRX in step 503 may be time that is N time units earlier than the start moment corresponding to the current activation time of the SL DRX of the first terminal device and that is M time units later than the end moment. N and M may be configured by the second terminal device or predefined in a protocol. It may be understood that N and M are positive integers greater than or equal to 1.

504: This step is the same as step 404 in FIG. 4, and details are not described herein again.

Correspondingly, the first terminal device sends the third message to the second terminal device.

It can be understood that in the foregoing solution, the first terminal device that uses the SL DRX may receive, from the second terminal device, a message used to request a resource set, so that the first terminal device that uses the SL DRX can determine the activation time of the SL DRX based on the message that is used to request the resource set and that is received from the second terminal device, and perform monitoring in the activation time of the SL DRX to obtain, through contention, a resource set that meets a requirement of the second terminal device. In addition, the resource set that meets the requirement of the second terminal device is sent to the second terminal device, so that the second terminal device can obtain the resource set that meets the requirement. This avoids impact on quality of communication between the first terminal device and the second terminal device when the first terminal device uses the SL DRX.

Figures 6, 7:
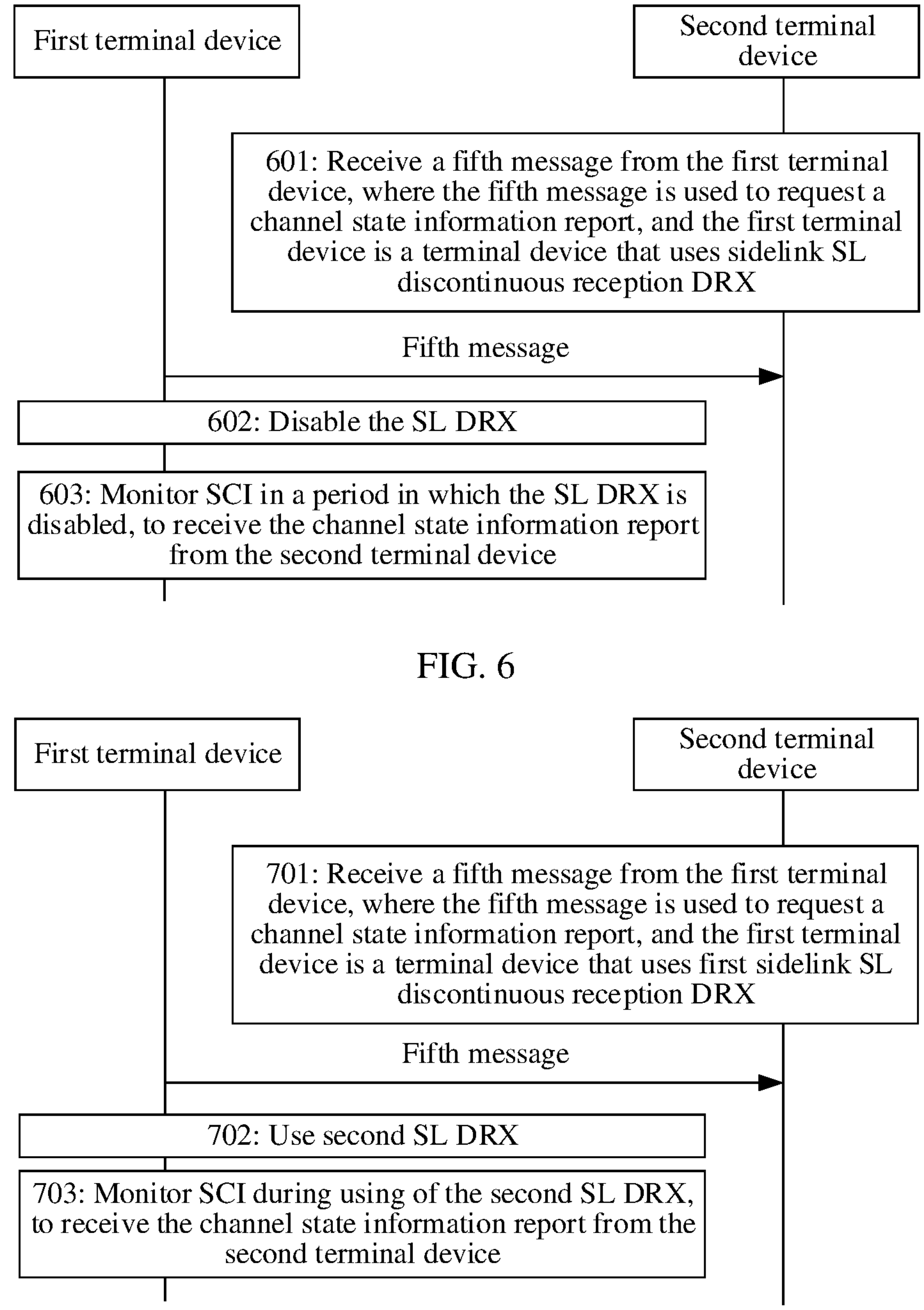
FIG. 6 is a schematic flowchart of still another communication method according to an embodiment.
FIG. 7 is a schematic flowchart of still another communication method according to an embodiment.

FIG. 6 is a schematic flowchart of still another communication method according to an embodiment. A first terminal device in FIG. 6 is the first terminal device 10 in FIG. 1, and a second terminal device in FIG. 6 is the second terminal device 20 in FIG. 1. It should be noted that FIG. 6 describes how to receive a channel state information report sent by the second terminal device to the first terminal device when the first terminal device uses SL DRX, and how to avoid impact on quality of communication between the first terminal device and the second terminal device when the first terminal device uses the SL DRX. As shown in FIG. 6, the method includes but is not limited to the following steps.

601: The second terminal device receives a fourth message from the first terminal device, where the fourth message is used to request a channel state information report, and the first terminal device is a terminal device that uses the SL DRX.

Correspondingly, the first terminal device sends the fourth message to the second terminal device.

Optionally, the fourth message is a PHY layer message. The fourth message may be, for example, a channel state information reporting trigger (CSI reporting trigger) message or another message. This is not limited herein.

It should be noted that in the embodiments, the channel state information report may be understood as an SL channel state information report.

602: The first terminal device disables the SL DRX.

Optionally, step 602 may include: The first terminal device disables the SL DRX at a third moment. The third moment is determined based on a moment at which the first terminal device sends the fourth message to the second terminal device. It may be understood that the third moment may be a moment at which the first terminal device sends the fourth message to the second terminal device, or the third moment may be determined based on the moment at which the first terminal device sends the fourth message to the second terminal device and at least one time unit.

Optionally, that the third moment may be determined based on the moment at which the first terminal device sends the fourth message to the second terminal device and at least one time unit may be understood as: The third moment is a moment corresponding to the first time unit that is after the moment at which the first terminal device sends the fourth message to the second terminal device. The third moment is a moment corresponding to a start of the first time unit that is after the moment at which the first terminal device sends the fourth message to the second terminal device.

Optionally, the method further includes: A PHY layer of the first terminal device indicates a MAC layer of the first terminal device to disable the SL DRX. That a PHY layer of the first terminal device indicates a MAC layer of the first terminal device to disable the SL DRX may be understood as: At the third moment, the PHY layer of the first terminal device indicates the MAC layer of the first terminal device to disable the SL DRX.

Optionally, step 602 may include: The first terminal device starts or restarts a third timer at the third moment, and disables the SL DRX during running of the third timer. Duration of the third timer may be duration configured by the second terminal device for the first terminal device by using a PC5 RRC message, or the duration of the third timer may be duration configured by an access network device for the first terminal device by using an RRC message, a system message, or a preconfiguration message, or the duration of the third timer may be predefined in a protocol, or the duration of the third timer may be a sidelink-latency bound-channel state information-report (sl-LatencyBound-CSI-Report). This is not limited herein.

Optionally, the method further includes: The PHY layer of the first terminal device indicates the MAC layer of the first terminal device to start or restart the third timer. That the PHY layer of the first terminal device indicates the MAC layer of the first terminal device to start or restart the third timer may be understood as: At the third moment, the PHY layer of the first terminal device indicates the MAC layer of the first terminal device to start or restart the third timer.

Optionally, that the first terminal device starts or restarts a third timer at the third moment, and disables the SL DRX during running of the third timer may be replaced with: The first terminal device disables the SL DRX in a third time period. The third time period is determined based on the third moment and the duration of the third timer.

Optionally, step 602 may include: The first terminal device starts or restarts a fourth timer at the third moment, and disables the SL DRX after the fourth timer expires. Duration of the fourth timer may be duration configured by the second terminal device for the first terminal device by using a PC5 RRC message, or the duration of the fourth timer may be duration configured by an access network device for the first terminal device by using an RRC message, a system message, or a preconfiguration message. The duration of the fourth timer may be, for example, predefined in a protocol. This is not limited herein.

Optionally, the method further includes: The PHY layer of the first terminal device indicates the MAC layer of the first terminal device to start or restart the fourth timer. That the PHY layer of the first terminal device indicates the MAC layer of the first terminal device to start or restart the fourth timer may be understood as: At the third moment, the PHY layer of the first terminal device indicates the MAC layer of the first terminal device to start or restart the fourth timer.

Optionally, step 602 may include: The first terminal device starts or restarts a fifth timer at the third moment, starts or restarts a sixth timer after the fifth timer expires, and disables the SL DRX during running of the sixth timer. Duration of the fifth timer may be duration configured by the second terminal device for the first terminal device by using a PC5 RRC message, or the duration of the fifth timer may be duration configured by an access network device for the first terminal device by using an RRC message, a system message, or a preconfiguration message. The duration of the fifth timer may be, for example, predefined in a protocol. This is not limited herein. Duration of the sixth timer may be duration configured by the second terminal device for the first terminal device by using a PC5 RRC message, or the duration of the sixth timer may be duration configured by an access network device for the first terminal device by using an RRC message, a system message, or a preconfiguration message. The duration of the sixth timer may be, for example, predefined in a protocol. This is not limited herein.

Optionally, a sum of the duration of the fifth timer and the duration of the sixth timer may be predefined by an sl-LatencyBound-CSI-Report or a protocol. This is not limited herein.

Optionally, the method further includes: The PHY layer of the first terminal device indicates the MAC layer of the first terminal device to start or restart the fifth timer. That the PHY layer of the first terminal device indicates the MAC layer of the first terminal device to start or restart the fifth timer may be understood as: At the third moment, the PHY layer of the first terminal device indicates the MAC layer of the first terminal device to start or restart the fifth timer.

603: The first terminal device monitors SCI in a period in which SL DRX is disabled, to receive the channel state information report from the second terminal device.

Optionally, step 603 may include: The first terminal device monitors, in the period in which the SL DRX is disabled, SCI carried on a PSCCH and/or a PSSCH, to receive the channel state information report from the second terminal device.

Optionally, the channel state information report in step 603 may be carried in an SL MAC CE, and the first terminal device monitors, in the period in which the SL DRX is disabled, the SCI carried on the PSCCH and/or the PSSCH, to receive the SL MAC CE from the second terminal device.

It can be understood that in the foregoing solution, the first terminal device that uses the SL DRX may send the message used to request the channel state information report to the second terminal device, and disable the SL DRX, so that the first terminal device can monitor the SCI in the period in which the SL DRX is disabled, to receive the channel state information report from the second terminal device. This avoids impact on communication quality between the first terminal device and the second terminal device when the first terminal device uses the SL DRX.

Optionally, the method further includes: The first terminal device enables the SL DRX at a fourth moment. The fourth moment is determined based on a moment at which the first terminal device receives the channel state information report from the second terminal device; or the fourth moment is determined based on the third moment and second duration.

The fourth moment may be the moment at which the first terminal device receives the channel state information report from the second terminal device, or the fourth moment may be determined based on the moment at which the first terminal device receives the channel state information report from the second terminal device and at least one time unit.

Optionally, that the fourth moment may be determined based on the moment at which the first terminal device receives the channel state information report from the second terminal device and at least one time unit may be understood as: The fourth moment may be a moment corresponding to the first time unit that is after the moment at which the first terminal device receives the channel state information report from the second terminal device. For example, the fourth moment may be a moment corresponding to a start of the first time unit that is after the moment at which the first terminal device receives the channel state information report from the second terminal device.

The second duration may be duration configured by the second terminal device for the first terminal device by using a PC5 RRC message, or the second duration may be duration configured by an access network device for the first terminal device by using an RRC message, a system message, or a preconfiguration message. The second duration may be, for example, predefined in a protocol. This is not limited herein.

It can be understood that in the foregoing solution, the first terminal device enables the SL DRX at the fourth moment, so that the first terminal device stops monitoring the SCI, to reduce energy consumption.

Optionally, the method may further include: The first terminal device enables the SL DRX at a moment at which the third timer expires or stops. The moment at which the third timer stops is determined based on the moment at which the first terminal device receives the channel state information report from the second terminal device.

The moment at which the third timer stops may be the moment at which the first terminal device receives the channel state information report from the second terminal device, or the moment at which the third timer stops may be determined based on the moment at which the first terminal device receives the channel state information report from the second terminal device and at least one time unit.

Optionally, that the moment at which the third timer stops may be determined based on the moment at which the first terminal device receives the channel state information report from the second terminal device and at least one time unit may be understood as: The moment at which the third timer stops is a moment corresponding to the first time unit that is after the moment at which the first terminal device receives the channel state information report from the second terminal device. For example, the moment at which the third timer stops is a moment corresponding to a start of the first time unit that is after the moment at which the first terminal device receives the channel state information report from the second terminal device.

It can be understood that in the foregoing solution, the first terminal device enables the SL DRX at the moment at which the third timer expires or stops, so that the first terminal device stops monitoring the SCI, to reduce energy consumption.

Optionally, the method may further include: The first terminal device enables the SL DRX at a moment at which the sixth timer expires or stops. The moment at which the sixth timer stops is determined based on the moment at which the first terminal device receives the channel state information report from the second terminal device.

The moment at which the sixth timer stops may be the moment at which the first terminal device receives the channel state information report from the second terminal device, or the moment at which the sixth timer stops may be determined based on the moment at which the first terminal device receives the channel state information report from the second terminal device and at least one time unit.

Optionally, that the moment at which the sixth timer stops may be determined based on the moment at which the first terminal device receives the channel state information report from the second terminal device and at least one time unit may be understood as: The moment at which the sixth timer stops is a moment corresponding to the first time unit that is after the moment at which the first terminal device receives the channel state information report from the second terminal device. For example, the moment at which the sixth timer stops is a moment corresponding to a start of the first time unit that is after the moment at which the first terminal device receives the channel state information report from the second terminal device.

It can be understood that in the foregoing solution, the first terminal device enables the SL DRX at the moment at which the sixth timer expires or stops, so that the first terminal device stops monitoring the SCI, to reduce energy consumption.

Optionally, the method further includes: The PHY layer of the first terminal device indicates the MAC layer of the first terminal device to enable the SL DRX.

That the PHY layer of the first terminal device indicates the MAC layer of the first terminal device to enable the SL DRX may be understood as: At the fourth moment, the PHY layer of the first terminal device indicates the MAC layer of the first terminal device to enable the SL DRX.

FIG. 7 is a schematic flowchart of still another communication method according to an embodiment. A first terminal device in FIG. 7 is the first terminal device 10 in FIG. 1, and a second terminal device in FIG. 7 is the second terminal device 20 in FIG. 1. It should be noted that FIG. 7 describes how to receive a channel state information report sent by the second terminal device to the first terminal device when the first terminal device uses SL DRX, and how to avoid impact on quality of communication between the first terminal device and the second terminal device when the first terminal device uses the SL DRX. As shown in FIG. 7, the method includes but is not limited to the following steps:

701: The second terminal device receives a fourth message from the first terminal device, where the fourth message is used to request a channel state information report, and the first terminal device is a terminal device that uses first SL DRX.

Correspondingly, the first terminal device sends the fourth message to the second terminal device.

Optionally, the fourth message is a PHY layer message. The fourth message may be, for example, a channel state information reporting trigger (CSI reporting trigger) message or another message. This is not limited herein.

702: The first terminal device uses second SL DRX.

Correspondingly, the second terminal device may also use the second SL DRX.

For example, the second SL DRX may be SL CSI reporting DRX.

Activation time corresponding to the first terminal device that uses the first SL DRX is different from activation time corresponding to the first terminal device that uses the second SL DRX.

For example, the activation time corresponding to the first terminal device that uses the first SL DRX is included in the activation time corresponding to the first terminal device that uses the second SL DRX; or sleep time corresponding to the first terminal device that uses the first SL DRX partially or completely overlaps the activation time corresponding to the first terminal device that uses the second SL DRX.

Optionally, step 702 may include: The first terminal device uses the second SL DRX at a third moment. For the third moment, refer to the related description in step 602 in FIG. 6. Details are not described herein again.

Optionally, the method further includes: A PHY layer of the first terminal device indicates a MAC layer of the first terminal device to use the second SL DRX. That a PHY layer of the first terminal device indicates a MAC layer of the first terminal device to use the second SL DRX may be understood as: At the third moment, the PHY layer of the first terminal device indicates the MAC layer of the first terminal device to use the second SL DRX.

Optionally, step 702 may include: The first terminal device starts or restarts a third timer at the third moment, and uses the second SL DRX during running of the third timer. For duration of the third timer, refer to the related description in step 602 in FIG. 6. Details are not described herein again.

Optionally, the method further includes: The PHY layer of the first terminal device indicates the MAC layer of the first terminal device to start or restart the third timer. That the PHY layer of the first terminal device indicates the MAC layer of the first terminal device to start or restart the third timer may be understood as: At the third moment, the PHY layer of the first terminal device indicates the MAC layer of the first terminal device to start or restart the third timer.

Optionally, that the first terminal device starts or restarts a third timer at a third moment, and uses the second SL DRX during running of the third timer may be replaced with: The first terminal device uses the second SL DRX in a third time period. The third time period is determined based on the third moment and duration of the third timer.

Optionally, step 702 may include: The first terminal device starts or restarts a fourth timer at the third moment, and uses the second SL DRX after the fourth timer expires. For duration of the fourth timer, refer to the related description in step 602 in FIG. 6. Details are not described herein again.

Optionally, the method further includes: The PHY layer of the first terminal device indicates the MAC layer of the first terminal device to start or restart the fourth timer. That the PHY layer of the first terminal device indicates the MAC layer of the first terminal device to start or restart the fourth timer may be understood as: At the third moment, the PHY layer of the first terminal device indicates the MAC layer of the first terminal device to start or restart the fourth timer.

Optionally, step 702 may include: The first terminal device starts or restarts a fifth timer at the third moment, starts or restarts a sixth timer after the fifth timer expires, and uses the second SL DRX during running of the sixth timer. For duration of the fifth timer and duration of the sixth timer, refer to the related description in step 602 in FIG. 6. Details are not described herein again.

Optionally, the method further includes: The PHY layer of the first terminal device indicates the MAC layer of the first terminal device to start or restart the fifth timer. That the PHY layer of the first terminal device indicates the MAC layer of the first terminal device to start or restart the fifth timer may be understood as: At the third moment, the PHY layer of the first terminal device indicates the MAC layer of the first terminal device to start or restart the fifth timer.

Optionally, step 702 may be replaced with: The first terminal device determines activation time of the second SL DRX in the third time period. A start moment of the third time period is determined based on the third moment and third duration, and an end moment of the third time period is an end moment of an sl-LatencyB ound-CSI-Report. The third duration may be configured by the second terminal device for the first terminal device by using a PC5 RRC message, or may be predefined in a protocol. This is not limited herein.

703: The first terminal device monitors SCI during using of the second SL DRX, to receive the channel state information report from the second terminal device.

Optionally, step 703 may include: The first terminal device monitors SCI carried on a PSCCH and/or a PSSCH during using of the second SL DRX, to receive the channel state information report from the second terminal device.

Optionally, the channel state information report in step 703 may be carried in an SL MAC CE, and the first terminal device monitors, during using of the second SL DRX, the SCI carried on the PSCCH and/or the PSSCH, to receive the SL MAC CE from the second terminal device.

It can be understood that in the foregoing solution, the first terminal device that uses the first SL DRX may send the message used to request the channel state information report to the second terminal device, and uses the second SL DRX, so that the first terminal device can monitor the SCI during using of the second SL DRX, to receive the channel state information report from the second terminal device. This avoids impact on communication quality between the first terminal device and the second terminal device when the first terminal device uses the SL DRX. In addition, because the first terminal device that uses the second SL DRX does not perform full sensing, energy consumption is reduced.

Optionally, the method further includes: The first terminal device uses the first SL DRX at a fourth moment. The fourth moment is determined based on a moment at which the first terminal device receives the channel state information report from the second terminal device; or the fourth moment is determined based on the third moment and second duration.

For the fourth moment, refer to the related description in step 603 in FIG. 6. Details are not described herein again.

The second duration may be duration configured by the second terminal device for the first terminal device by using a PC5 RRC message, or the second duration may be duration configured by an access network device for the first terminal device by using an RRC message, a system message, or a preconfiguration message. The second duration may be, for example, predefined in a protocol. This is not limited herein.

It can be understood that in the foregoing solution, the first terminal device uses the first SL DRX at the fourth moment, so that the first terminal device stops monitoring the SCI, to reduce energy consumption.

Optionally, the method further includes: The first terminal device uses the first SL DRX at a moment at which the third timer expires or stops. The moment at which the third timer stops is determined based on the moment at which the first terminal device receives the channel state information report from the second terminal device.

For the moment at which the third timer stops, refer to the related description in step 603 in FIG. 6. Details are not described herein again.

It can be understood that in the foregoing solution, the first terminal device uses the first SL DRX at the moment at which the third timer expires or stops, so that the first terminal device stops monitoring the SCI, to reduce energy consumption.

Optionally, the method further includes: The first terminal device uses the first SL DRX at a moment at which the sixth timer expires or stops. The moment at which the sixth timer stops is determined based on the moment at which the first terminal device receives the channel state information report from the second terminal device.

For the moment at which the sixth timer stops, refer to the related description in step 603 in FIG. 6. Details are not described herein again.

It can be understood that in the foregoing solution, the first terminal device uses the first SL DRX at the moment at which the sixth timer expires or stops, so that the first terminal device stops monitoring the SCI, to reduce energy consumption.

Optionally, the method further includes: The PHY layer of the first terminal device indicates the MAC layer of the first terminal device to use the first SL DRX.

That the PHY layer of the first terminal device indicates the MAC layer of the first terminal device to use the first SL DRX may be understood as: At the fourth moment, the PHY layer of the first terminal device indicates the MAC layer of the first terminal device to use the first SL DRX.

Figure 8:
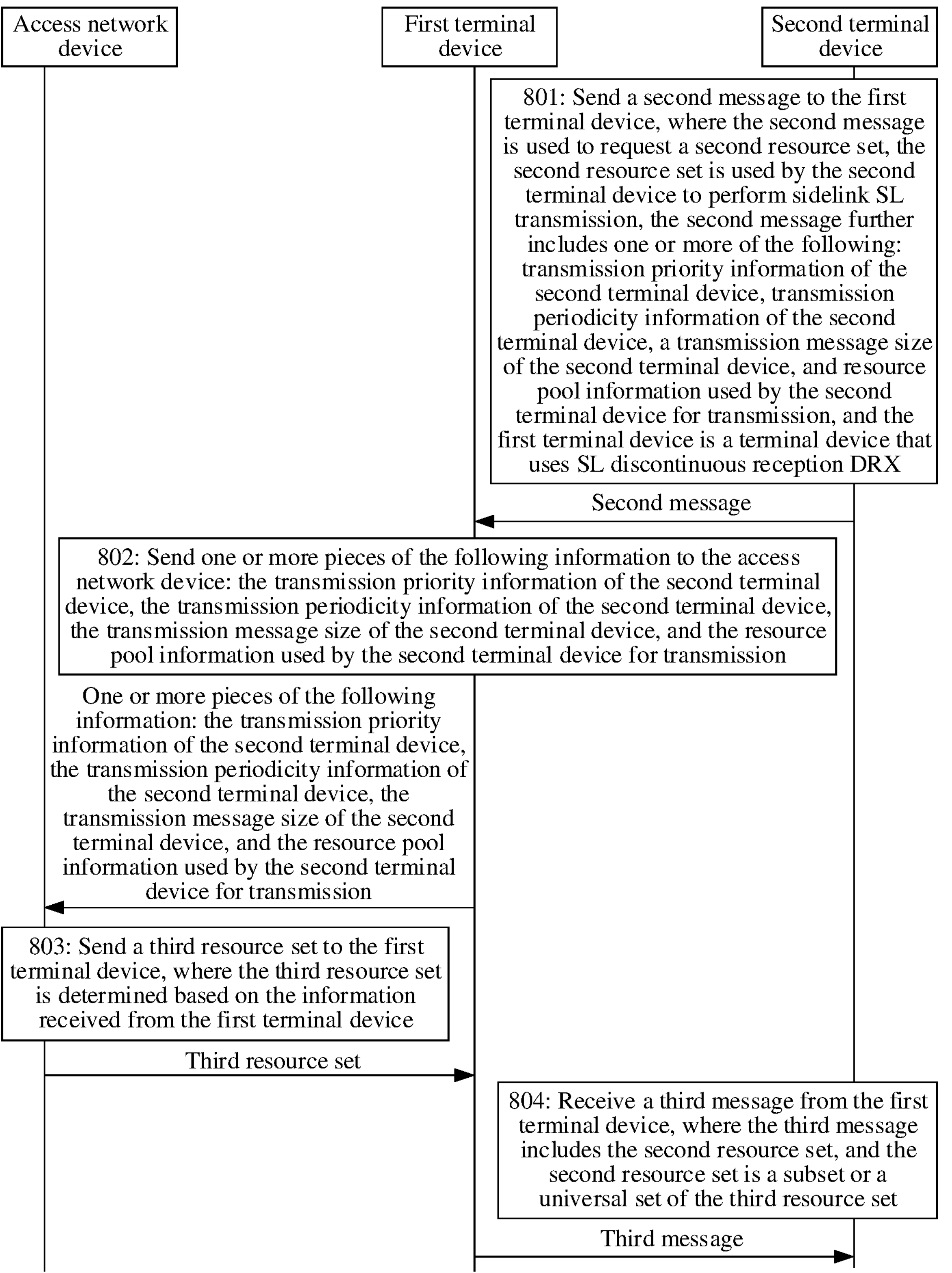
FIG. 8 is a schematic flowchart of still another communication method according to an embodiment.

FIG. 8 is a schematic flowchart of still another communication method according to an embodiment. A first terminal device in FIG. 8 is the first terminal device 10 in FIG. 1, a second terminal device in FIG. 8 is the second terminal device 20 in FIG. 1, and an access network device in FIG. 8 is the access network device 30 in FIG. 1. It should be noted that FIG. 8 describes how to obtain a resource set that meets a requirement of the second terminal device by using the access network device when the first terminal device uses SL DRX, and how to avoid impact on quality of communication between the first terminal device and the second terminal device when the first terminal device uses the SL DRX. As shown in FIG. 8, the method includes but is not limited to the following steps.

801: The second terminal device sends a second message to the first terminal device, where the second message is used to request a second resource set, the second resource set is used by the second terminal device for SL transmission, the second message further includes one or more of the following: transmission priority information of the second terminal device, transmission periodicity information of the second terminal device, a transmission message size of the second terminal device, and resource pool information used by the second terminal device for transmission, and the first terminal device is a terminal device that uses the SL DRX.

Correspondingly, the first terminal device receives the second message from the second terminal device.

The second message may be a PC5 RRC message, a PHY layer message, or an SL MAC CE message. This is not limited herein. It may be understood that, for the PHY layer message, refer to the related description in step 301 in FIG. 3. Details are not described herein again.

For example, the second message may be, for example, an inter-terminal device coordination information request (inter-UE coordination information request) message.

The second resource set may include a time domain resource and a frequency domain resource. This is not limited herein. It may be understood that, for the time domain resource and the frequency domain resource, refer to the related description in step 301 in FIG. 3. Details are not described herein again.

That the second resource set is used by the second terminal device for SL transmission may be understood as: The second resource set is used by the second terminal device for SL transmission with the first terminal device. That is, the second terminal device performs SL transmission with the first terminal device by using a resource corresponding to the second resource set. Also, the second resource set may be further used by the second terminal device for SL transmission with another terminal device. This is not limited herein.

Optionally, step 801 may include: The second terminal device broadcasts a second message. The second message further includes a destination layer 2 identifier or a destination layer 1 identifier, and the destination layer 2 identifier or the destination layer 1 identifier indicates a service type corresponding to the requested second resource set. It may be understood that, if the second terminal device broadcasts the first message, the second message may be an SL MAC CE message or a PHY message.

It can be understood that in the foregoing solution, the second terminal device broadcasts the second message. The second message further includes the destination layer 2 identifier or the destination layer 1 identifier, and the destination layer 2 identifier or the destination layer 1 identifier indicates the service type corresponding to the requested second resource set, so that the first terminal device can determine, based on the destination layer 2 identifier or the destination layer 1 identifier, the second resource set that needs to be obtained.

Optionally, the second message may further include third indication information, and the third indication information indicates that the second resource set is used by the second terminal device for SL transmission with the first terminal device; or the third indication information indicates that the second resource set is used by the second terminal device for SL transmission with a terminal device other than the second terminal device. This is not limited herein.

802: The first terminal device sends one or more pieces of the following information to the access network device: the transmission priority information of the second terminal device, the transmission periodicity information of the second terminal device, the transmission message size of the second terminal device, and the resource pool information used by the second terminal device for transmission.

Correspondingly, the access network device receives one or more pieces of the following information from the first terminal device: the transmission priority information of the second terminal device, the transmission periodicity information of the second terminal device, the transmission message size of the second terminal device, and the resource pool information used by the second terminal device for transmission.

Optionally, that the first terminal device sends one or more pieces of the following information to the access network device: the transmission priority information of the second terminal device, the transmission periodicity information of the second terminal device, the transmission message size of the second terminal device, and the resource pool information used by the second terminal device for transmission may include: The first terminal device sends one or more pieces of the following information to the access network device by using a scheduling request (SR) or a buffer status report (BSR): the transmission priority information of the second terminal device, the transmission periodicity information of the second terminal device, the transmission message size of the second terminal device, and the resource pool information used by the second terminal device for transmission.

It should be noted that, in the embodiments, the scheduling request may be understood as an SL scheduling request, and the buffer status report may be understood as an SL buffer status report.

803: The access network device sends a third resource set to the first terminal device, where the third resource set is determined based on the information received from the first terminal device.

The third resource set may include a time domain resource and a frequency domain resource. This is not limited herein. It may be understood that, for the time domain resource and the frequency domain resource, refer to the related description in step 301 in FIG. 3. Details are not described herein again.

It may be understood that the information received by the first terminal device may include one or more pieces of the following information: the transmission priority information of the second terminal device, the transmission periodicity information of the second terminal device, the transmission message size of the second terminal device, and the resource pool information used by the second terminal device for transmission.

804: This step is the same as step 404 in FIG. 4, and details are not described herein again.

It can be understood that in the foregoing solution, the first terminal device that uses the SL DRX may receive, from the second terminal device, a message used to request a resource set, so that the first terminal device that uses the SL DRX can send, to the access network device, the information used to determine the resource set. Because the information used to determine the resource set is from the second terminal device, the access network device may obtain a resource set that meets a requirement of the second terminal device. In addition, the first terminal device that uses the SL DRX may obtain, from the access network device, the resource set that meets the requirement of the second terminal device, and send the resource set that meets the requirement of the second terminal device to the second terminal device, so that the second terminal device can obtain the resource set that meets the requirement. This avoids impact on communication quality between the first terminal device and the second terminal device when the first terminal device uses the SL DRX.

Optionally, the method further includes: If a preset condition is met, the first terminal device enters an RRC connected state after receiving the second message. The preset condition includes: The first terminal device is in an RRC idle state; or the first terminal device is in an RRC inactive state; or the first terminal device is in an out-of-coverage state.

Optionally, that the first terminal device enters the RRC connected state after receiving the second message may include: After receiving the second message, the first terminal device enters the RRC connected state if the first terminal device does not obtain the resource set that meets the requirement of the second terminal device.

It should be noted that, in the embodiments, in the implementations in FIG. 3 to FIG. 8, a combination solution of any implementation falls within the scope of the embodiments.

The foregoing describes the solutions provided in the embodiments from a perspective of interaction between the network elements. It may be understood that, to implement the foregoing functions, each network element includes a corresponding hardware structure and/or software module for executing each function. A person skilled in the art should easily be aware that, in combination with units and algorithm steps of the examples described in the embodiments, the embodiments may be implemented by hardware or a combination of hardware and computer software. Whether a function is performed by hardware or hardware driven by computer software depends on particular applications and design constraints of the solutions. A person skilled in the art may use different methods to implement the described functions for each particular application, but it should not be considered that the implementation goes beyond the scope of the embodiments.

In the embodiments, the first terminal device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments, module division is an example, and is merely a logical function division. During actual implementation, another division manner may be used.

Figures 9, 10:
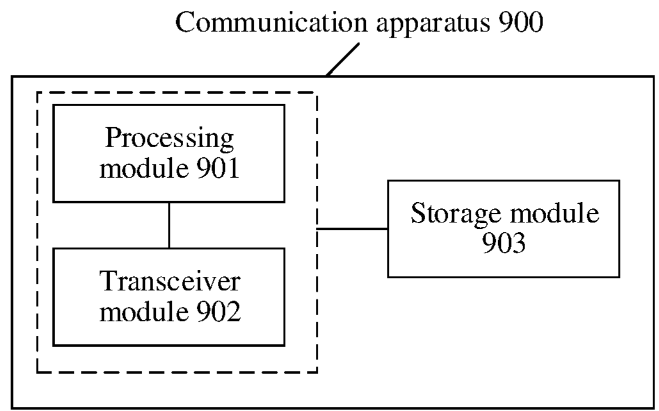
FIG. 9 is a schematic diagram of a structure of a communication apparatus according to an embodiment.
FIG. 10 is a schematic diagram of a simplified structure of a terminal device according to an embodiment.

When an integrated unit is used, FIG. 9 is a schematic diagram of a structure of a communication apparatus according to an embodiment. The communication apparatus 900 may be used in the methods shown in FIG. 3 to FIG. 8. As shown in FIG. 9, the communication apparatus 900 includes a processing module 901 and a transceiver module 902. The processing module 901 may be one or more processors, and the transceiver module 902 may be a transceiver or a communication interface. The communication apparatus may be configured to implement the first terminal device in any one of the method embodiments, or may be configured to implement a function of a network element in any one of the method embodiments. The network element or function may be a network element in a hardware device, a software function running on dedicated hardware, or a virtualized function instantiated on a platform (for example, a cloud platform). Optionally, the communication apparatus 900 may further include a storage module 903, configured to store program code and data of the communication apparatus 900.

In an example, when the communication apparatus is used as the first terminal device or a chip used in the first terminal device, the communication apparatus performs the steps performed by the first terminal device in the method embodiments. The transceiver module 902 is configured to support communication with a second terminal device, an access network device, or the like. The transceiver module performs sending and/or receiving actions performed by the first terminal device in FIG. 3 to FIG. 8, for example, supports the first terminal device in performing one or more steps in step 301 and step 601, and/or is configured to perform another process of the embodiments. The processing module 901 may be configured to support the communication apparatus 900 in performing the processing actions in the method embodiments, for example, support the first terminal device in performing one or more steps in step 302 and step 303, and/or another process of the embodiments.

It should be noted that, in the embodiments, when the communication apparatus 900 is used in the method shown in FIG. 3 to FIG. 6 or FIG. 8, the communication apparatus 900 may be a first terminal device that uses SL DRX or a chip that uses the SL DRX in the first terminal device. When the communication apparatus 900 is used in the method shown in FIG. 7, the communication apparatus 900 may be a first terminal device that uses first SL DRX or a chip that uses the first SL DRX in the first terminal device.

In a possible implementation, when the first terminal device is a chip, the transceiver module 902 may be an interface, a pin, a circuit, or the like. The interface may be configured to input to-be-processed data to a processor, and may output a processing result of the processor to the outside. During specific implementation, the interface may be a general purpose input output (GPIO) interface, and may be connected to a plurality of peripheral devices (for example, a display (LCD), a camera, a radio frequency (RF) module, and an antenna). The interface is connected to the processor through a bus.

The processing module 901 may be a processor. The processor may execute computer-executable instructions stored in a storage module, so that the chip performs the methods according to the embodiments in FIG. 3 to FIG. 8.

Further, the processor may include a controller, an arithmetic unit, and a register. For example, the controller is responsible for decoding instructions and sending a control signal for an operation corresponding to the instructions. The arithmetic unit is responsible for performing a fixed-point or floating-point arithmetic operation, a shift operation, a logic operation, and the like, and may also perform an address operation and address translation. The register is responsible for saving a quantity of register operations, intermediate operation results, and the like that are temporarily stored during instruction execution. During specific implementation, a hardware architecture of the processor may be an application-specific integrated circuit (ASIC) architecture, a microprocessor without interlocked piped stages architecture (MIPS), an advanced reduced instruction set computing machines (ARM) architecture, a network processor (NP) architecture, or the like. The processor may be a single-core or multi-core processor.

The storage module may be a storage module inside the chip, for example, a register or a cache. Alternatively, the storage module may be a storage module located outside the chip, for example, a read-only memory (ROM), another type of static storage device that can store static information and instructions, or a random access memory (RAM).

It should be noted that a function corresponding to each of the processor and the interface may be implemented by using a hardware design, may be implemented by using a software design, or may be implemented by a combination of software and hardware. This is not limited herein.

FIG. 10 is a schematic diagram of a simplified structure of a terminal device according to an embodiment. For ease of understanding and illustration, in FIG. 10, a mobile phone is used as an example of the terminal device. It may be understood that the terminal device in FIG. 10 may be a first terminal device or a second terminal device. This is not limited herein. As shown in FIG. 10, the terminal device includes at least one processor, and may further include a radio frequency circuit, an antenna, and an input/output apparatus. The processor may be configured to process a communication protocol and communication data, and may be further configured to control the terminal device, execute a software program, process data of the software program, and the like. The terminal device may further include a memory. The memory is configured to store a software program and data. These related programs may be loaded into the memory when the communication apparatus is delivered from a factory, or may be loaded into the memory when needed later. The radio frequency circuit is configured to: perform conversion between a baseband signal and a radio frequency signal, and process the radio frequency signal. The antenna is configured to receive and send a radio frequency signal in an electromagnetic wave form, and the antenna is the antenna provided in the embodiments. The input/output apparatus, such as a touchscreen, a display, or a keyboard, is configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, a non-transitory computer readable storage medium, or the like. The memory may be disposed independent of the processor, or may be integrated with the processor. This is not limited in the embodiments.

In this embodiment, an antenna having sending and receiving functions and the radio frequency circuit may be considered as a receiving unit and a sending unit (which may also be collectively referred to as a transceiver unit) of the terminal device, and a processor having a processing function may be considered as a processing unit of the terminal device. As shown in FIG. 10, the terminal device includes a receiving module 31, a processing module 32, and a sending module 33. The receiving module 31 may also be referred to as a receiver, a receiver circuit, or the like. The sending module 33 may also be referred to as a transmitter, a transmitter circuit, or the like. The processing module 32 may also be referred to as a processor, a processing board, a processing apparatus, or the like.

For example, the processing module 32 is configured to perform a function of the first terminal device in any one of the embodiments shown in FIG. 3 to FIG. 8.

Figure 11:
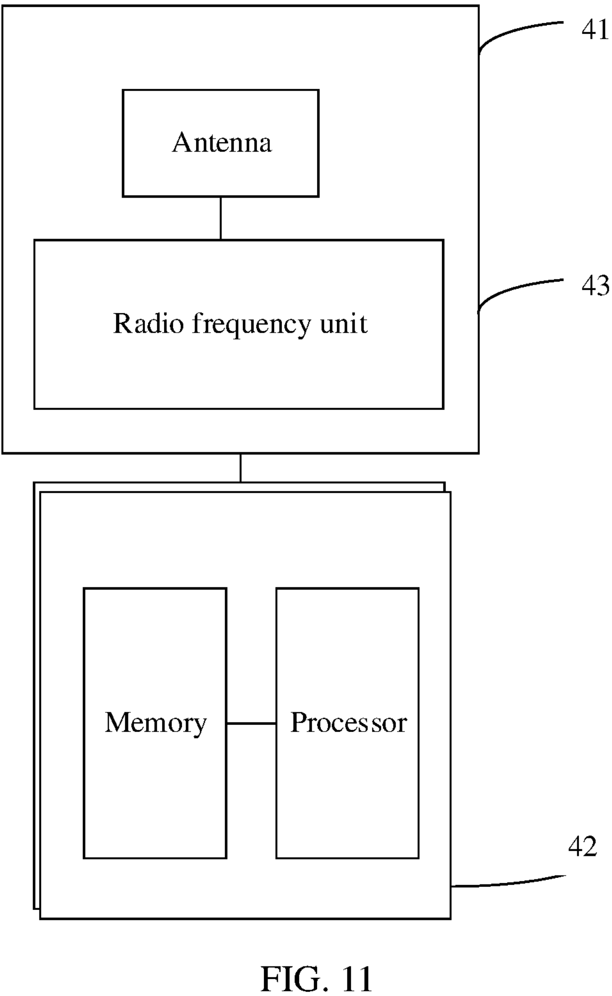
FIG. 11 is a schematic diagram of a simplified structure of an access network device according to an embodiment.

FIG. 11 is a schematic diagram of a simplified structure of an access network device according to an embodiment. The access network device includes a part 42 and a part for radio frequency signal sending/receiving and conversion. The part for radio frequency signal sending/receiving and conversion further includes a receiving module 41 and a sending module 43 (which may also be collectively referred to as a transceiver module). The part for radio frequency signal sending/receiving and conversion is configured to send/receive a radio frequency signal and perform conversion between the radio frequency signal and a baseband signal. The part 42 is configured to perform baseband processing, control the access network device, and the like. The receiving module 41 may also be referred to as a receiver, a receiver circuit, or the like. The sending module 43 may also be referred to as a transmitter, a transmitter circuit, or the like. The part 42 can be a control center of the access network device, may be referred to as a processing module, and is configured to control the access network device to perform the steps performed by the terminal device or the access network device in FIG. 3 to FIG. 8. For details, refer to the foregoing descriptions of the related parts.

The part 42 may include one or more boards. Each board may include one or more processors and one or more memories. The processor is configured to read and execute a program in the memory to implement a baseband processing function and control the access network device. If there are a plurality of boards, the boards may be interconnected to improve a processing capability. In an optional implementation, the plurality of boards may share one or more processors, the plurality of boards may share one or more memories, or the plurality of boards may share one or more processors at the same time.

For example, for the access network device, the sending module 43 is configured to perform a function of the access network device in any one of the embodiments shown in FIG. 3 to FIG. 8.

An embodiment further provides a communication apparatus, including a processor, a memory, an input interface, and an output interface. The input interface is configured to receive information from a communication apparatus other than a first device. The output interface is configured to output information to a communication apparatus other than the first device. The processor invokes a computer program stored in the memory to implement any one of the embodiments shown in FIG. 3 to FIG. 8.

An embodiment further provides a non-transitory computer-readable storage medium. The non-transitory computer-readable storage medium stores a computer program. When the computer program is run, any one of the embodiments shown in FIG. 3 to FIG. 8 is implemented.

An embodiment further provides a computer program product. When a computer reads and executes the computer program product, the computer is enabled to implement any one of the embodiments shown in FIG. 3 to FIG. 8.

In the foregoing implementations, the objectives, solutions, and beneficial effects are further described in detail. It should be understood that the foregoing descriptions are merely implementations of the embodiments, but are not intended as limiting. Any modification, equivalent replacement, improvement, or the like made based on the solutions of the embodiments shall fall within the scope of the embodiments.

What is claimed is:

1. A communication method applied to a first terminal device, the first terminal device is a terminal device that uses sidelink (SL) discontinuous reception (DRX), the method comprising:

sending a first message to a second terminal device, wherein the first message comprises a first resource set, and the first resource set is used by the second terminal device for SL transmission;

using a resource corresponding to the first resource set as activation time of the SL DRX, or disabling the SL DRX on the resource corresponding to the first resource set; and monitoring sidelink control information (SCI) on the resource corresponding to the first resource set, wherein the SCI comprises SCI from the second terminal device;

wherein sending the first message to the second terminal device comprises:

broadcasting the first message, wherein the first message further comprises a destination layer 2 identifier or a destination layer 1 identifier, and the destination layer 2 identifier or the destination layer 1 identifier indicates a service type corresponding to the first resource set.

2. The communication method according to claim 1, wherein the first message is a PC5 radio resource control (RRC) message, and an RRC layer of the first terminal device indicates, to a media access control (MAC) layer of the first terminal device, activation time corresponding to the first resource set, or indicates the MAC layer of the first terminal device to disable the SL DRX; or the first message is a physical (PHY) layer message, and a PHY layer of the first terminal device indicates, to the MAC layer of the first terminal device, the activation time corresponding to the first resource set, or indicates the MAC layer of the first terminal device to disable the SL DRX; or the first message is an SL MAC control element (CE) message.

3. An apparatus, comprising:

at least one processor, and a memory storing instructions for execution by the at least one processor;

wherein, when executed, the instructions cause the apparatus to perform operations comprising:

sending a first message to a second terminal device, wherein the first message comprises a first resource set, and the first resource set is used by the second terminal device for sidelink (SL) transmission;

using a resource corresponding to the first resource set as activation time of the SL discontinuous reception (DRX), or disabling the SL DRX on the resource corresponding to the first resource set; and monitoring sidelink control information (SCI) on the resource corresponding to the first resource set, wherein the SCI comprises SCI from the second terminal device;

wherein sending the first message to the second terminal device comprises:

broadcasting the first message, wherein the first message further comprises a destination layer 2 identifier or a destination layer 1 identifier, and the destination layer 2 identifier or the destination layer 1 identifier indicates a service type corresponding to the first resource set.

4. The apparatus according to claim 3, wherein the first message is a PC5 radio resource control (RRC) message, and an RRC layer of the first terminal device indicates, to a media access control (MAC) layer of the first terminal device, activation time corresponding to the first resource set, or indicates the MAC layer of the first terminal device to disable the SL DRX; or the first message is a physical (PHY) layer message, and a PHY layer of the first terminal device indicates, to the MAC layer of the first terminal device, the activation time corresponding to the first resource set, or indicates the MAC layer of the first terminal device to disable the SL DRX; or the first message is an SL MAC control element (CE) message.

5. A communication method applied to a first terminal device, the first terminal device is a terminal device that uses sidelink (SL) discontinuous reception (DRX), the method comprising:

sending a first message to a second terminal device, wherein the first message comprises a first resource set, and the first resource set is used by the second terminal device for SL transmission;

using a resource corresponding to the first resource set as activation time of the SL DRX, or disabling the SL DRX on the resource corresponding to the first resource set; and monitoring sidelink control information (SCI) on the resource corresponding to the first resource set, wherein the SCI comprises SCI from the second terminal device;

wherein sending the first message to the second terminal device comprises:

broadcasting the first message, wherein the first message further comprises a destination layer 2 identifier or a destination layer 1 identifier, and the destination layer 2 identifier or the destination layer 1 identifier indicates a service type corresponding to the first resource set;

wherein the first message is a PC5 radio resource control (RRC) message, and an RRC layer of the first terminal device indicates, to a media access control (MAC) layer of the first terminal device, activation time corresponding to the first resource set, or indicates the MAC layer of the first terminal device to disable the SL DRX; or the first message is a physical (PHY) layer message, and a PHY layer of the first terminal device indicates, to the MAC layer of the first terminal device, the activation time corresponding to the first resource set, or indicates the MAC layer of the first terminal device to disable the SL DRX; or the first message is an SL MAC control element (CE) message.

* * * * *